United States Patent [19]

Abellana et al.

[11] Patent Number: 4,519,048

[45] Date of Patent: May 21, 1985

[54] POSTAGE METER SYSTEM FOR COMMUNICATING PLATEN MOVEMENT TO A MICROPROCESSOR TO SIGNAL COMPLETION OF PRINTING

[75] Inventors: Jovito N. Abellana; Edward C. Duwel, both of Trumbull, Conn.

[73] Assignee: Pitney Bowes Inc., Stamford, Conn.

[21] Appl. No.: 447,904

[22] Filed: Dec. 8, 1982

[51] Int. Cl.[3] ........................ G06F 15/21; G06F 3/12; G06F 3/02

[52] U.S. Cl. .................................... 364/900; 364/464; 364/466; 364/518; 318/312; 101/93.12; 101/93.41; 101/69; 235/101

[58] Field of Search ....... 364/200 MS FILE, 900 MS FILE, 364/466, 518, 464; 318/312; 177/3; 101/35, 45, 91, 288, 93.04, 93.12, 69, 93.41; 235/101; 400/614.1, 616.3, 521-534

[56] References Cited

U.S. PATENT DOCUMENTS

| | | | |
|---|---|---|---|
| 4,090,063 | 5/1978 | Martin | 235/92 AC |
| 4,246,643 | 1/1981 | Hubbard | 364/900 |
| 4,319,328 | 3/1982 | Eggert | 364/466 |
| 4,326,460 | 4/1982 | Nückel | 101/110 |
| 4,331,075 | 5/1982 | Williams | 101/91 |
| 4,441,920 | 4/1984 | Buan et al. | 101/69 |

*Primary Examiner*—James D. Thomas
*Assistant Examiner*—A. E. Williams, Jr.
*Attorney, Agent, or Firm*—Peter Vrahotes; William D. Soltow, Jr.; Albert W. Scribner

[57] ABSTRACT

The invention has particular utility when utilized in a stand-alone electronic mailing machine of the reciprocating platen type. The entire drive mechanism, setting mechanism, and control devices as well as the postage metering mechanisms are all contained in one housing so that there is no need for a separate base. A single central processing unit is utilized along with memory for the purpose of accounting for the postage value that has been charged into the mailing machine as well as the amount that has been used. A pair of stepper motors is used for the purpose of adjusting the print dies with the amounts that are to be imprinted. One of the stepper motors is also used to trip a single revolution clutch which is utilized to affect the printing operation.

6 Claims, 32 Drawing Figures

Fig. 1.
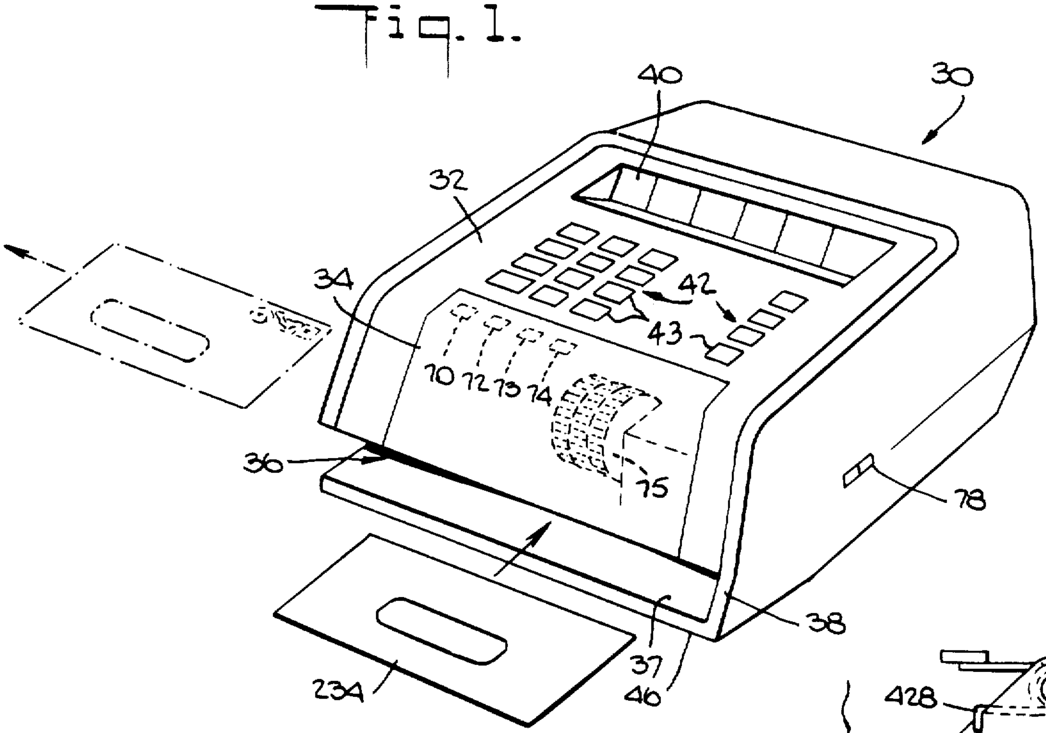
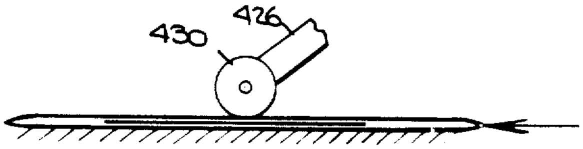
Fig. 24.
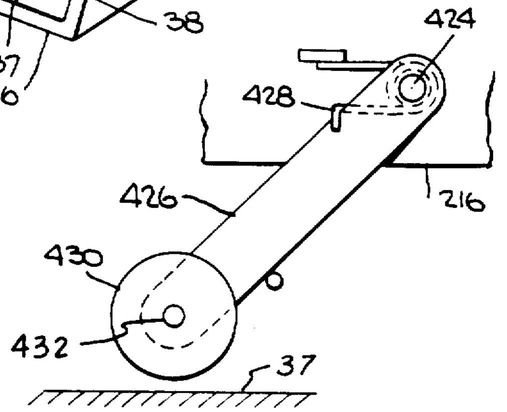
Fig. 23.
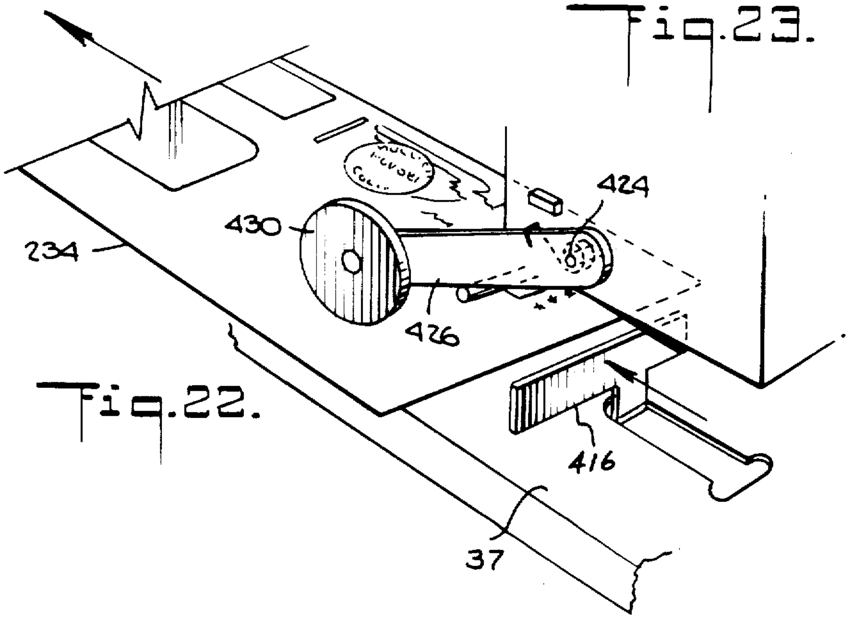
Fig. 22.

Fig. 13.
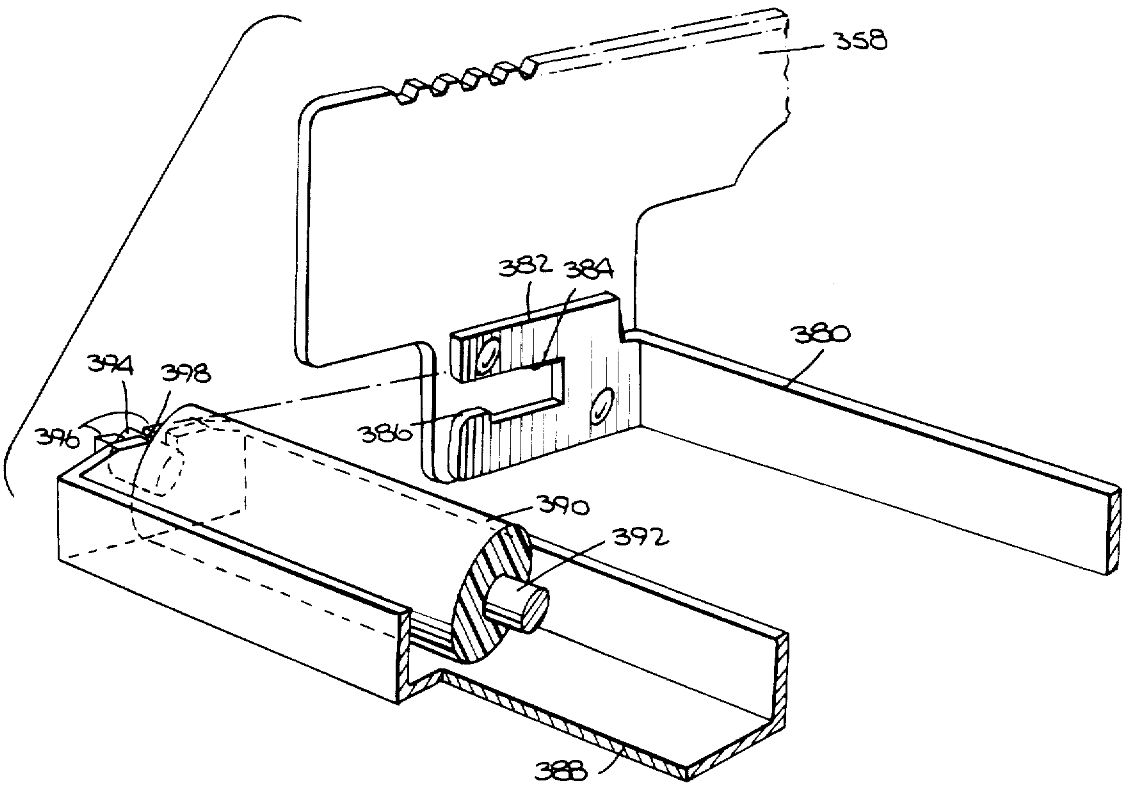
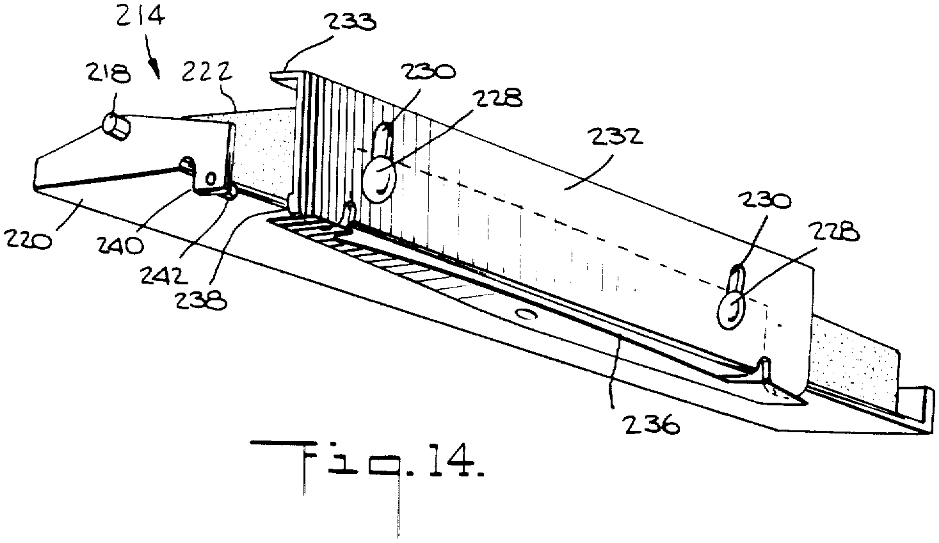
Fig. 14.

POSTAGE METER SYSTEM FOR COMMUNICATING PLATEN MOVEMENT TO A MICROPROCESSOR TO SIGNAL COMPLETION OF PRINTING

BACKGROUND OF THE INVENTION

Since the first postage meter was invented by Mr. Arthur H. Pitney at the turn of the century, the postage meter had a rather steady evolution until the late 1970's. During this long period, the postage meter was basically a mechanical device involving a printing means with ascending and descending registers. The meter could be charged with a fixed amount of postage and there could be accounting of the amount of postage that had been used as well as a record of the amount of postage remaining. What is commonly referred to as a postage meter is actually two separate units, the postage meter and the base or mailing machine. Although the base is also referred to as the mailing machine, as used in this specification the term mailing machine includes the postage meter and drive means therefor. The postage meter is that portion of the device that has the printing dies as well as the ascending and descending registers. The base is that portion of the device that supplies drive to the postage meter portion. The reason for making this device in two separable units was because the postage meter portion had to be brought to a post office periodically in order to have more postage charged to such meter. It obviously would be less of a task to carry the postage meter part of the machine without having to bring the drive portion as well. For this reason, the heavier parts of the machine were located in the base.

With the advent of the dynamic growth in the field of electronics, the postage meter has experienced radical changes. The first change to take place was that of the ability to reset the meter postage remotely. This was accomplished through the use of telephone lines providing connection between the postage meters and a central station wherein an amount of postage would be charged to the account of a user and his postage meter would be reset accordingly by such central station through use of a code. The second change that has taken place is the advent of the electronic postage meter. Whereas previous postage meters had relied almost exclusively on mechanical systems, the recently developed electronic postage meters perform tasks such as setting, accounting and printing through electromechanical and electronic means. In order to accomplish such tasks, electronic postage meters have utilized central processing units, memories, counters and the like for the purpose of performing tasks that had previously been performed mechanically. The first electronic postage meters paralleled the prior mechanical meters in that they were designed to fit upon a base. In fact, the first electronic postage meters were designed so that they could be placed upon bases that had been designed for mechanical meters and which were readily available. With the companion advancement of the remote meter resetting systems, it is no longer necessary that the mailing machine be separated into two distinct units since the necessity of taking the meter to the post office for recharging has been eliminated. As a consequence, it would be desirable to have a self-contained electronic mailing machine that includes the metering function as well as all drive mechanisms that are controlled by electronic means. Obviously, such a device would be lighter, more compact, and more economical to produce.

SUMMARY OF THE INVENTION

A self-contained mailing machine of the reciprocating platen type has been fashioned which utilizes a single central processing unit (CPU) with accompanying memories, counters and the like, so that all the mechanical and accounting functions of the machine are controlled by the CPU through appropriate circuitry. The mailing machine is provided with a keyboard that may be used to initiate the printing of postage onto an envelope. The mailing machine of this invention utilizes a single revolution clutch that provides all the drive necessary for the imprinting of postage upon an envelope. Two stepper motors are utilized for the purpose of changing the settings on the print wheels of the print head. One of the stepper motors also serves to trip the single revolution clutch and to account for postage. The accounting for postage is accomplished by sensing the rotation and return of a trip shaft connected to one of the stepper motors and to the single revolution clutch.

BRIEF DESCRIPTION OF THE DRAWING

FIG. 1 shows a front perspective view of a mailing machine that incorporates the features of the instant invention;

FIG. 13 is a perspective view of a portion of the ink roller drive;

FIG. 14 is a perspective view of a stripper that is included in the mailing machine print station;

FIG. 22 is a perspective view of the envelope hold-down device used in the mailing machine;

FIG. 23 is a side elevational view of the hold-down device shown in FIG. 18;

FIG. 24 shows the hold-down device of FIG. 20 cooperating with an envelope;

DETAILED DESCRIPTION OF THE PREFERRED EMBODIMENT

Figure 2:
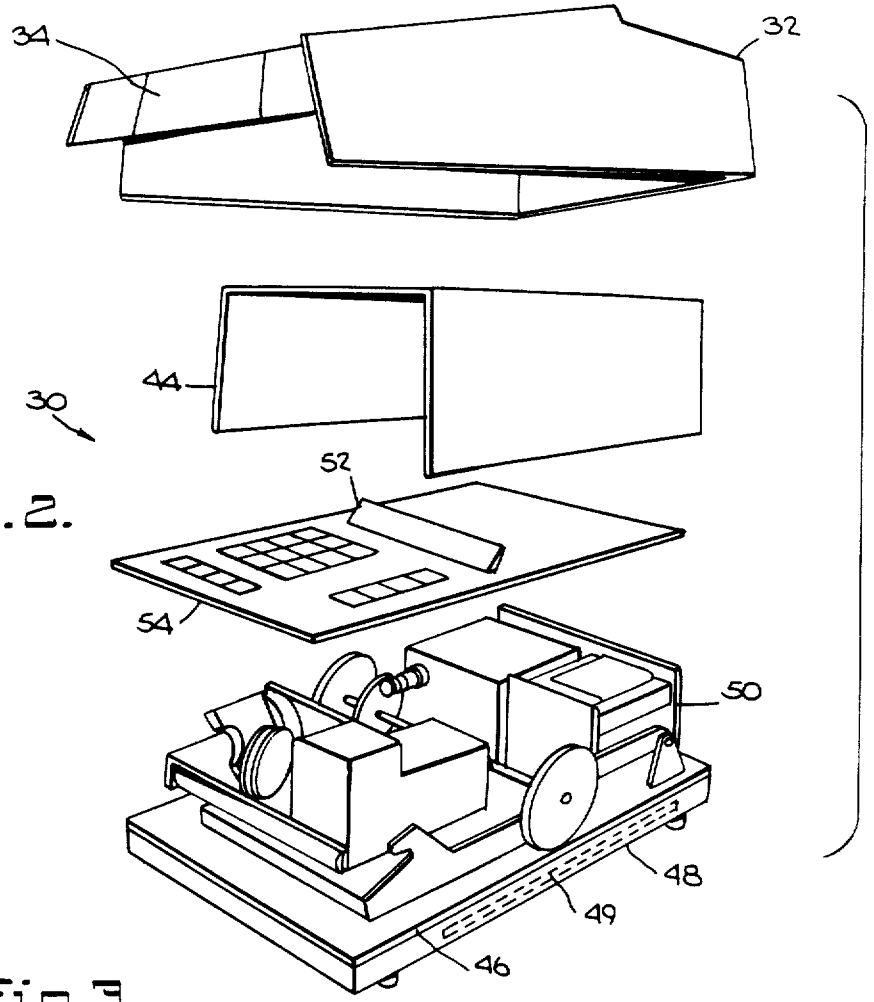
FIG. 2 is an exploded view of the mailing machine shown in FIG. 1.
Figure 3:
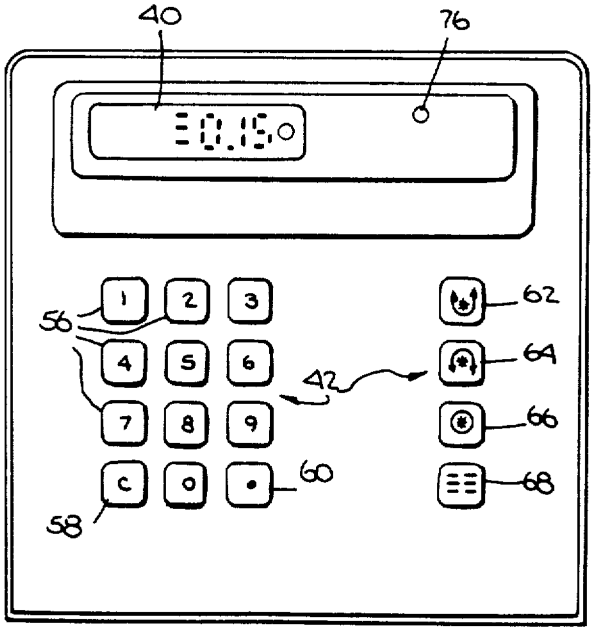
FIG. 3 is a plan view of the keyboard of the mailing machine shown in FIG. 1.

Referring now to the drawing, and more particularly to FIGS. 1-4, there is illustrated therein an electronic mailing machine generally shown at 30. The mailing machine 30 includes a cover 32 having a pivotal lid 34, a slot 36 therein with a closed end 38 at the right hand side thereof as seen in FIG. 1. A portion of the slot 36 forms a deck 37. At the top of the cover 32 is a display panel 40 and control panel 42 having openings 43 therein. The cover 32 and an electromagnetic insulating shield 44 are attached to a base 46, the cover and base together forming a housing. Depending from the base 46 is a pan 48 that contains a logic board 49. A power supply board 50, a display board 52 and a keyboard 54 are supported within the cover 32, the display board 52 being aligned with an opening in the display panel 40 and the keyboard 54 being aligned with the control panel 42. The keyboard 54 serves as an information inputting and information retrieval device and has a number of keys which extend into the openings 43 of the control panel 42 and become part of the control panel. Numeric setting keys 56, a clear key 58 and a decimal key 60 are located on the left hand side of the control panel 42. On the right hand side of the control panel 42 are a postage used key 62, a postage unused key 64, a postage sum or piece count key 66 and a select postage key 68. In the front of the mailing machine 30 and located under the lid 34 are selection keys for remote meter resetting operation including an authorization key 70, an enter amount key 72, and an enter combination key 73. Also located under the lid 34 is a date key 74 and a plurality of thumb wheels 75 which are connected to the date printing mechanism that will be described hereinafter. Preferably the keys on the control panel 42 are membrane switches. Shown on the display panel 40 is a check date indicator 76 that is electrically connected to the date key 74. An on/off power switch 78 is located on the side of the cover 32 for the control of power to be supplied to the electrical components of the mailing machine 30.

Referring now to FIGS. 4-9, the mailing machine 30 includes a pair of opposite side frames 80 and 81 supported by the base 46. A drive motor 82 is located between the side frames 80, 81 and mounted on the base 46. The output shaft 84 of the drive motor 82 has a gear 86 secured thereto. A shaft 88 is supported within ball bearings 90 (only one being shown) supported by a opposed walls 92 and 93. A gear 94 is mounted on the shaft 88 and meshes with the gear 86 on the drive shaft 84 to be driven thereby. A worm screw 96 is formed on the shaft 88 and meshes with a disc gear 98 of a single revolution spring clutch 100. A wall 102 extends between the walls 92, 93 and receives a shaft 104 therein, the other end of the shaft being supported by an opposite wall 103. Print cams 106, 108 are secured to opposite ends of the shaft 104 and another print cam 107 is secured to the shaft intermediate the two print cams. A die shelf extension bracket 110, a print bracket 111 and a rectifier bracket 112 receive a shaft 114, the print bracket being secured to the shaft 114 by set screws 115 for rotation therewith. A lever 116 is attached to the shaft 114 and has a cam follower 118 rotatably connected thereto by a pin 120. The cam follower 118 engages the cam 107 to be pivoted thereby and causes rotation of the shaft 114 which carries the rectifier bracket 112 therewith. A print head shown generally at 122 is supported within the rectifier bracket 112 and includes the print bracket 111 and the deck 37 has an opening 124 that is spaced relative to the print head.

Figure 7:
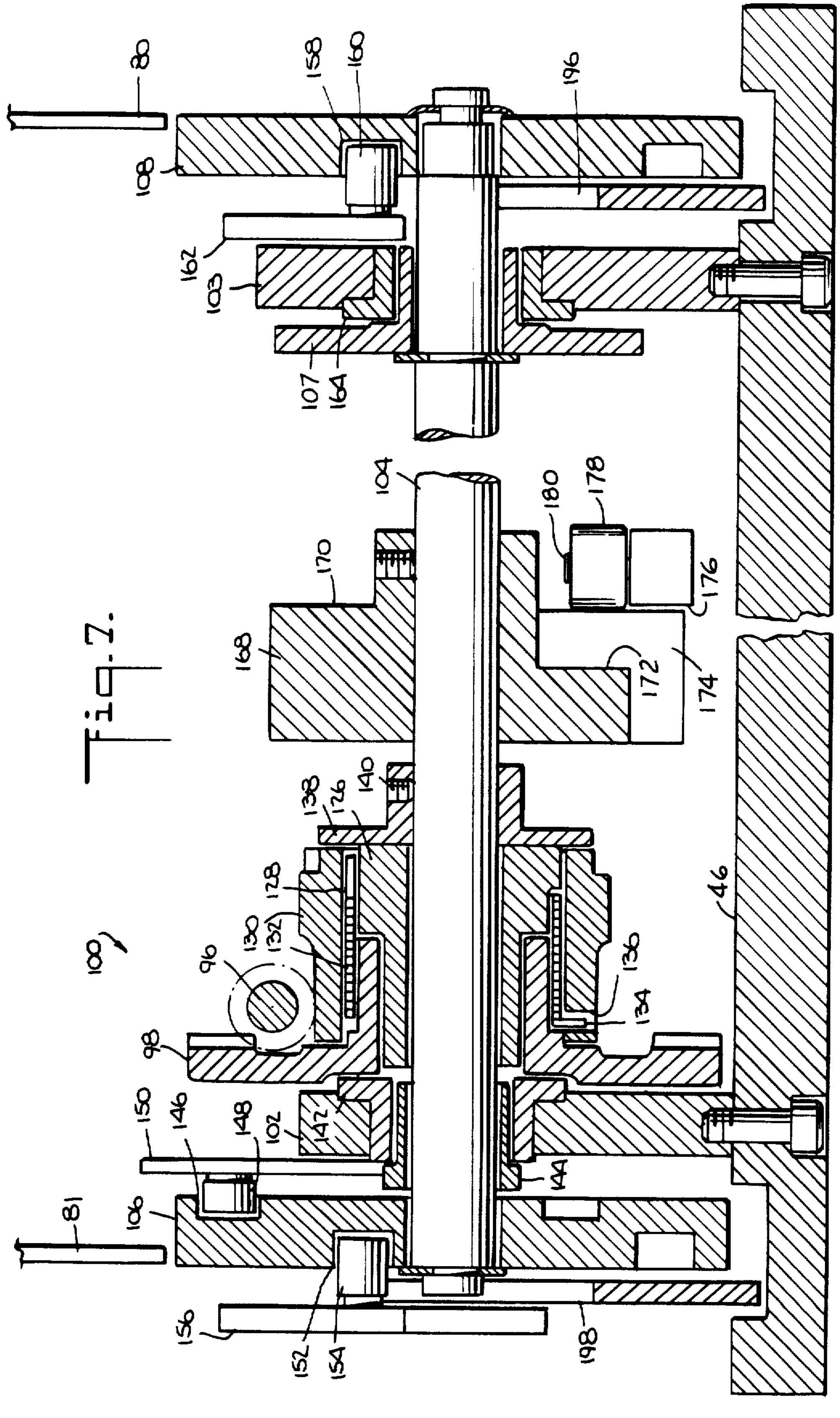
FIG. 7 is a cross-sectional view of the single revolution clutch utilized in the mailing machine shown in FIG. 1 and taken along the lines 7—7 of FIG. 5.

Referring to FIG. 7, the spring clutch shown generally at 100 includes the disc gear 98 and the shaft 104. A slidable member 126 is splined to the shaft 104 for rotation therewith and has an opening 128 therein. A confiner 130 is disposed about the slidable member 126 and a coil spring 132 is located between the slidable member and the confiner. One end of the spring 132 is received within the opening 128 of the slidable member 126 and the other end of the spring has a tab 134 that is received within an opening 136 of the confiner 130. A collar 138 is secured to the shaft 104 by a set screw 140 to limit the movement of the slidable member 126 and the confiner 130.

At one end of the slidable member 126 opposite to the collar 138 is a bushing 142 that is received witnin the wall 102 for the purpose of supporting the shaft 104. A bearing 144 is located within the bushing 142 and receives the shaft 104 to allow the shaft to rotate within the wall 102. The cam 106 is secured to the portion of the shaft 104 that extends beyond the bearing member 144. The cam 106 has a cam track 146 therein. The cam track 146 receives a cam follower 148 that is rotatably connected to an inking arm 150. The cam 106 has a second cam track 152 that receives a cam follower 154 that is rotatably secured to a printing arm 156. The cam 108 is secured to the opposite end of the shaft 104 and has a cam track 158 that receives a cam follower 160 that is rotatably attached to another printing arm 162.

A bearing 164 is located within the support wall 103 and receives the cam 107 therein, the cam being secured to the shaft 104 for rotation therewith. Also rotatably secured to the shaft 104 is another cam 168 having a pair of cam surfaces 170 and 172 with a step 174 formed therein (also see FIGS. 19 and 20). The radius of the step 174 is greater than the radius of the cam surfaces 170, 172. A substantially square bearing member 176 is engageable with the step 174 and a rotatable cam follower 178 is engageable with the cam surfaces 170, 172. The cam follower 178 is mounted by a pin 180 attached to the bearing member 176 which is formed as one end of an arm 182 that is attached at its other end to a lever 184 by a stub shaft 186 for movement therewith. The stub shaft 186 is rotatably received within an opening (not shown) of the base 46 and is connected to the lever 184 which is located below the base.

A pair of stanchions 188 and 190 (FIGS. 5 and 9) are laterally spaced opposite one another and are supported by the base 46. Received within the stanchions 188, 190 are a pair of stub shafts 192 and 194, respectively. A pair of platen arms 196 and 198 are supported by the stub shafts 192, 194 respectively, so as to rotate relative to the stanchions 188, 190. A grooved pin 200 is supported by the printing arm 162 and a companion pin 202 is supported by the platen arm 196. A tension spring 204 is mounted upon a hub 206 and engages the pins 200 and 202 so that the arms 162 and 196 are resiliently connected to one another. The hub 206 is riveted to the printing arm 162. Corresponding pins 208 (only one shown), spring 210 and hub 212 are associated with the printing arm 156 and platen arm 198.

Figure 9:
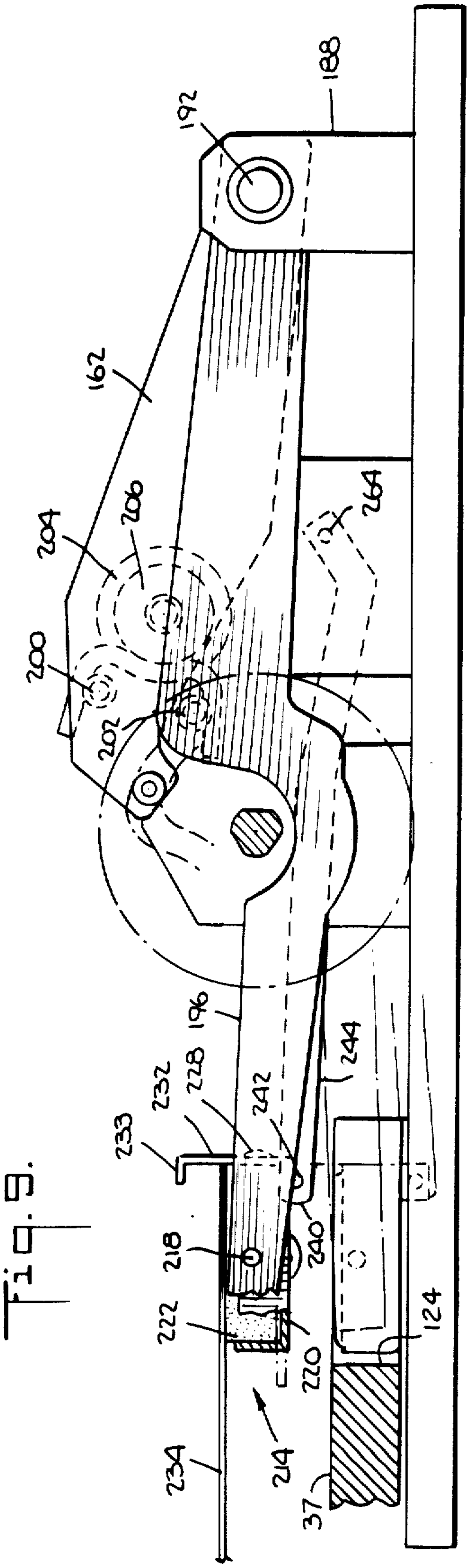
FIG. 9 is a detailed view of a portion of the print drive mechanism of the mailing machine shown in FIG. 1.
Figure 11:
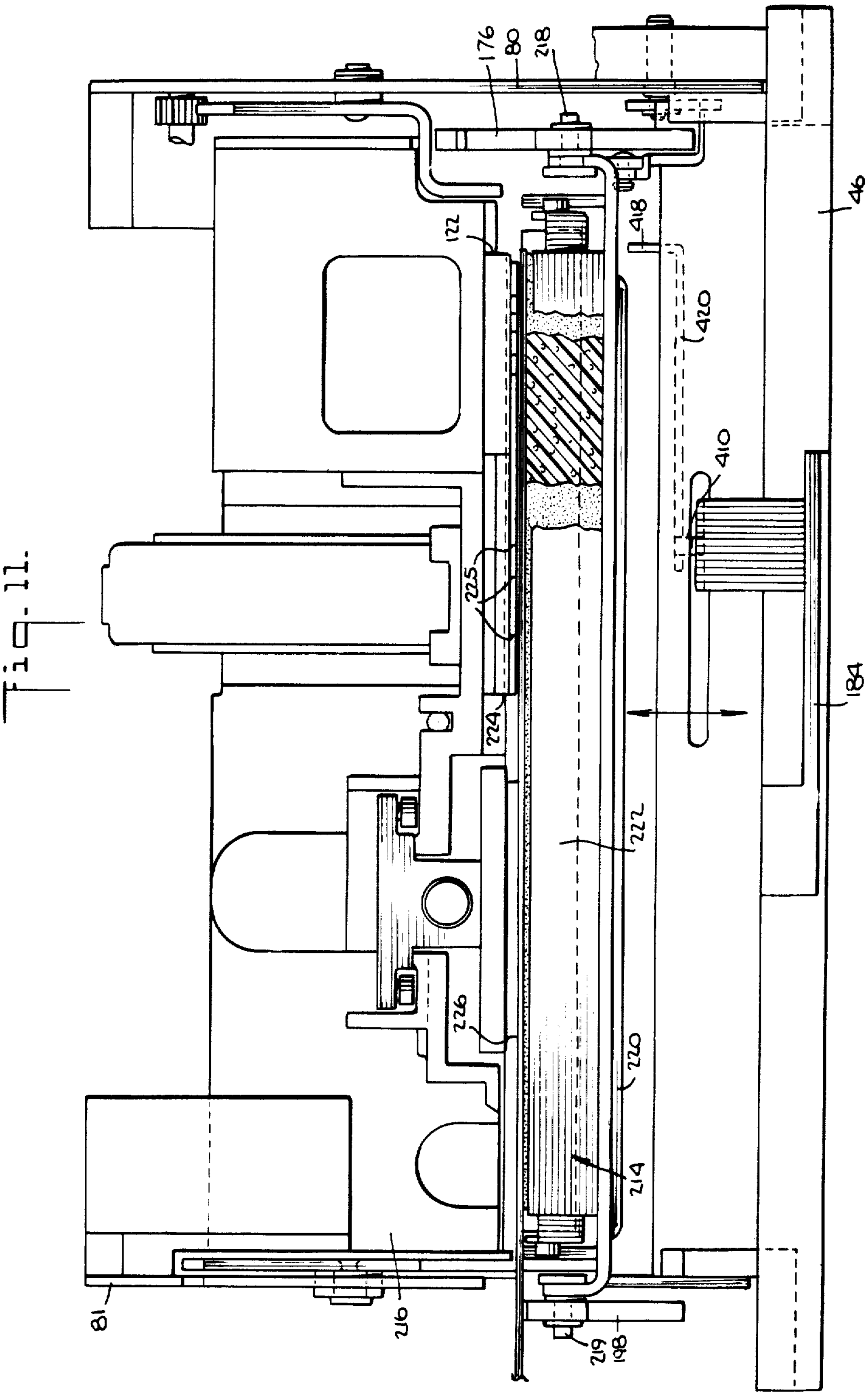
FIG. 11 is a cross-sectional view of the printing platen assembly taken along the lines 11—11 of FIG. 5.

Referring now to FIGS. 9, 11 and 14, a platen assembly is shown generally at 214 spaced relative to a casting 216 that is attached to the side frames 80, 81. The platen assembly 214 includes a pair of opposed pins 218 and 219 that are received within the platen arms 196, 198, respectively. A platen bracket 220 is secured to the pins 218, 219 and extends therebetween at the location of the opening 124 in the deck 37, the platen bracket receiving a foam rubber platen 222. The platen 222 is vulcanized to the platen bracket 220 to be secured thereto and extends parallel to the print head 122, a date printer 224 and a slogan die 226 all of which are housed within the casting 216. The date printer 224 has plurality of wheels 225 (only partially shown in FIG. 11) that are rotatably engaged by the thumb wheels 75 (FIG. 1) to be set thereby. A pair of studs 228 are attached to one side of the platen bracket 220 and are received within elongated openings 230 of a stripper bracket 232. The stripper bracket 232 has an upper lip 233 that projects from the stripper bracket intermediate the platen 222 and the print head 122. As seen in FIG. 9, an envelope 234 can be placed upon the deck 37 to be located intermediate the lip 233 of the stripper bracket 232 and the platen 222. A leaf spring 236 is riveted to the bottom of the platen bracket 220 and engages legs 238 that depend from the stripper bracket 232 to thereby bias the stripper bracket away from the platen 222. It will be noted that the stripper bracket 232 is slidable relative to the platen bracket 220 and is engageable with the casting 216. Depending from the platen bracket 220 is a tab 240 that receives a pin 242 to which a leveler link 244 is rotatably attached. The other end of the leveler link 244 is rotatably secured to the base 46 by a pin 246.

Figure 8:
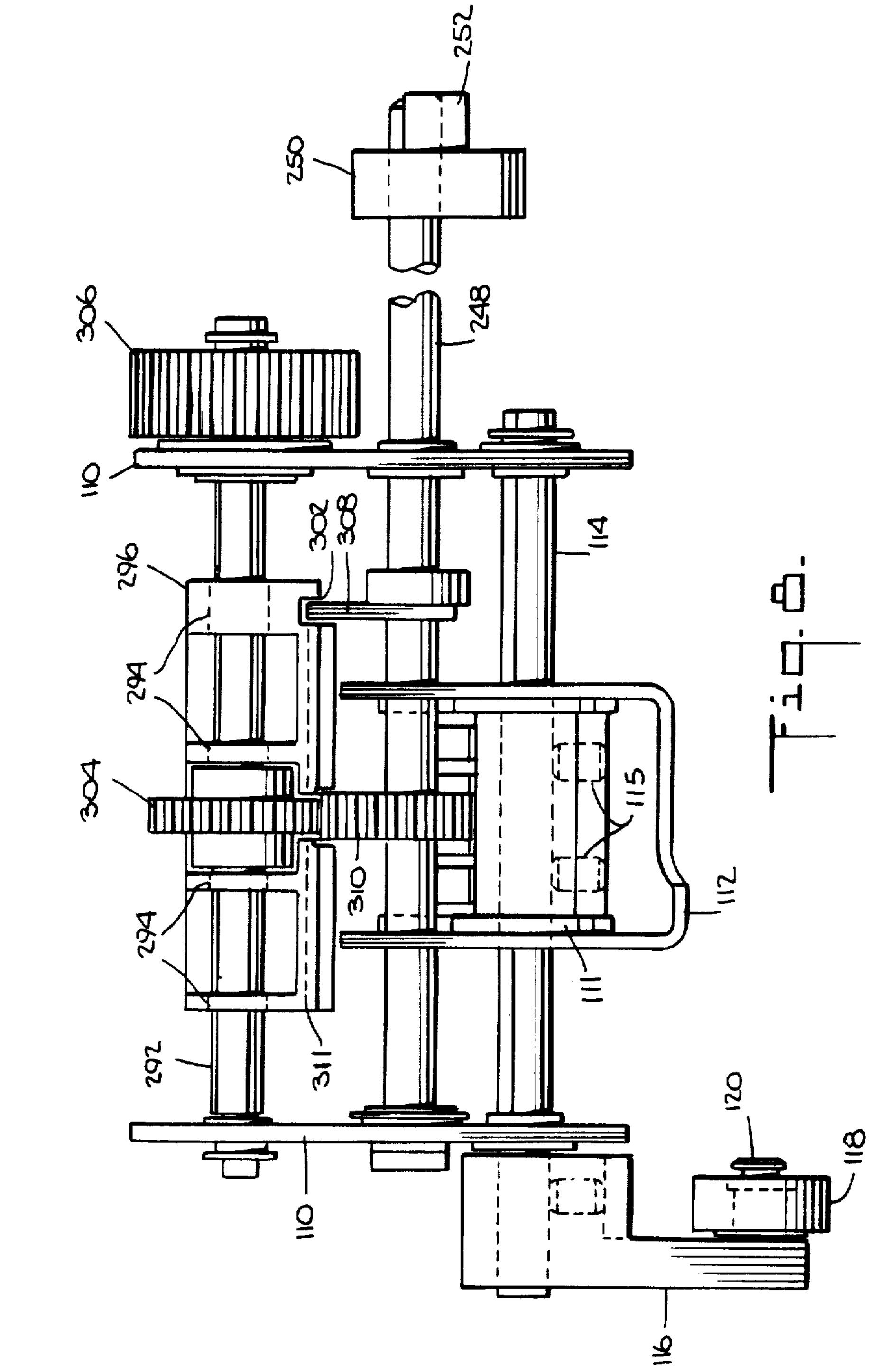
FIG. 8 is a detailed view of the locking mechanism for the print head of the mailing machine taken along the lines 8—8 of FIG. 5.

As seen in FIG. 8, the die shelf extension bracket 110 receives a trip shaft 248 that has a trip lever 250 secured thereto for rotation therewith. Referring more specifically to FIGS. 15–18, the trip lever 250 has a bar 252 attached thereto and the bar engages the inside surface of a pivot member 256. The pivot member 256 has a post 258 thereon and is rotatably supported by a shaft 260. At one end of the pivot member 256 is a bearing surface 262 which is positioned to be engageable with an abutment surface 264 of the confiner 130. At the other end of the pivot member 256 is another bearing surface 266. The pivot member 256 also has a shoulder 268 thereon which is adapted to mate with one end 270 of another pivot member 272, the pivot member 272 having a post 274 thereon and being rotatable about a shaft 276. A spring 278 is secured to the posts 258, 274 so as to urge the surface 268 of the pivot member 256 and the pivot member 256 toward one another through rotation of the pivot member 256 in the clockwise direction and the pivot member 272 in a counterclockwise direction as seen in FIGS. 15–18. The pivot member 272 has a bearing surface 280 on the other end thereof which is engageable with a shoulder 282 of the confiner 130. The confiner 130 has a projecting portion 284 forming another shoulder 286 that is engageable by a depending member 288 of the pivot member 272. Attached to a support bracket 290 that is mounted on the base 46 is a switch 291 having an actuator 293 that is engaged by a bearing surface 279 of the pivot member 272.

Figure 5:
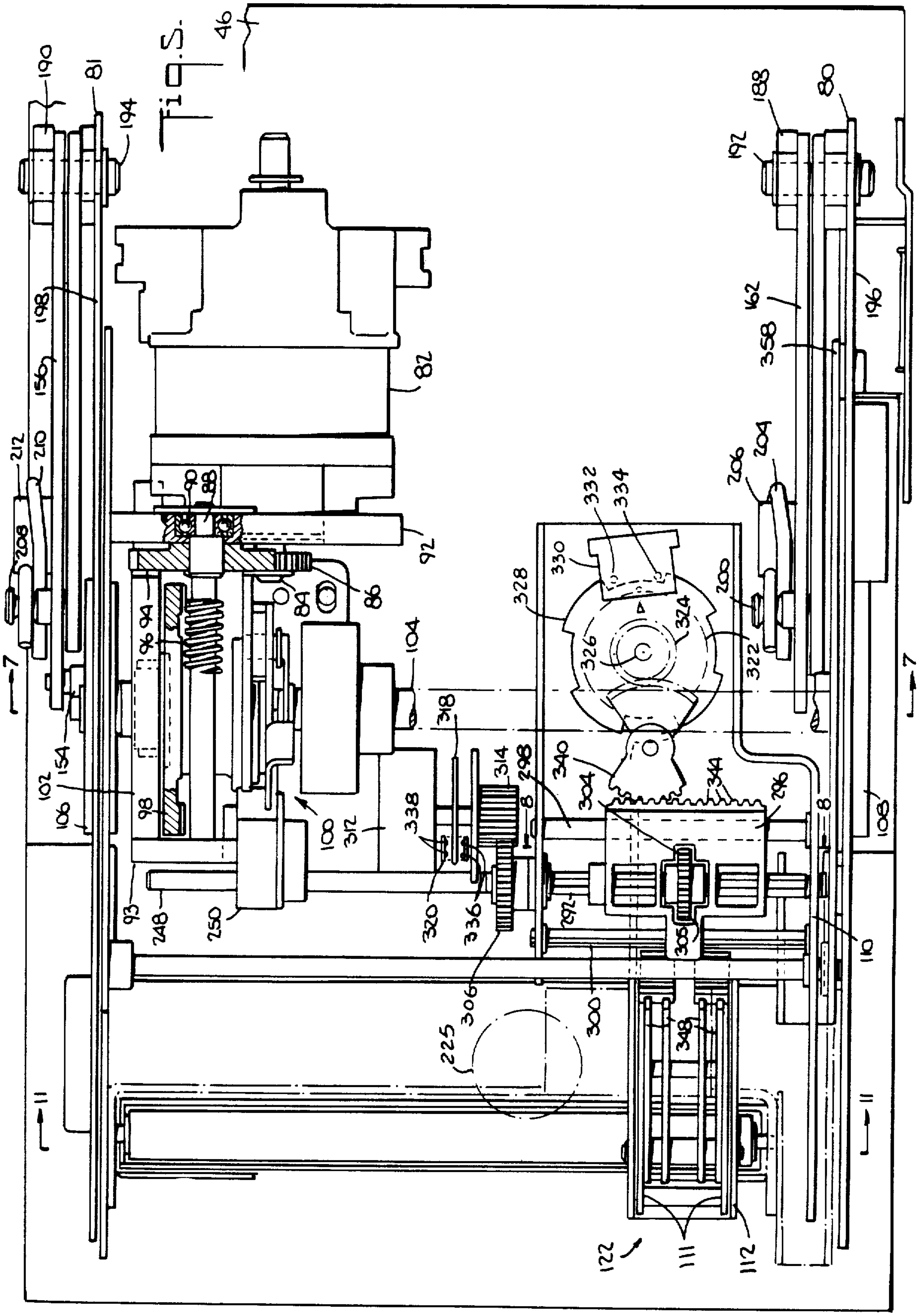
FIG. 5 is a plan view of the mailing machine taken along the lines 5—5 of FIG. 4.
Figure 6:
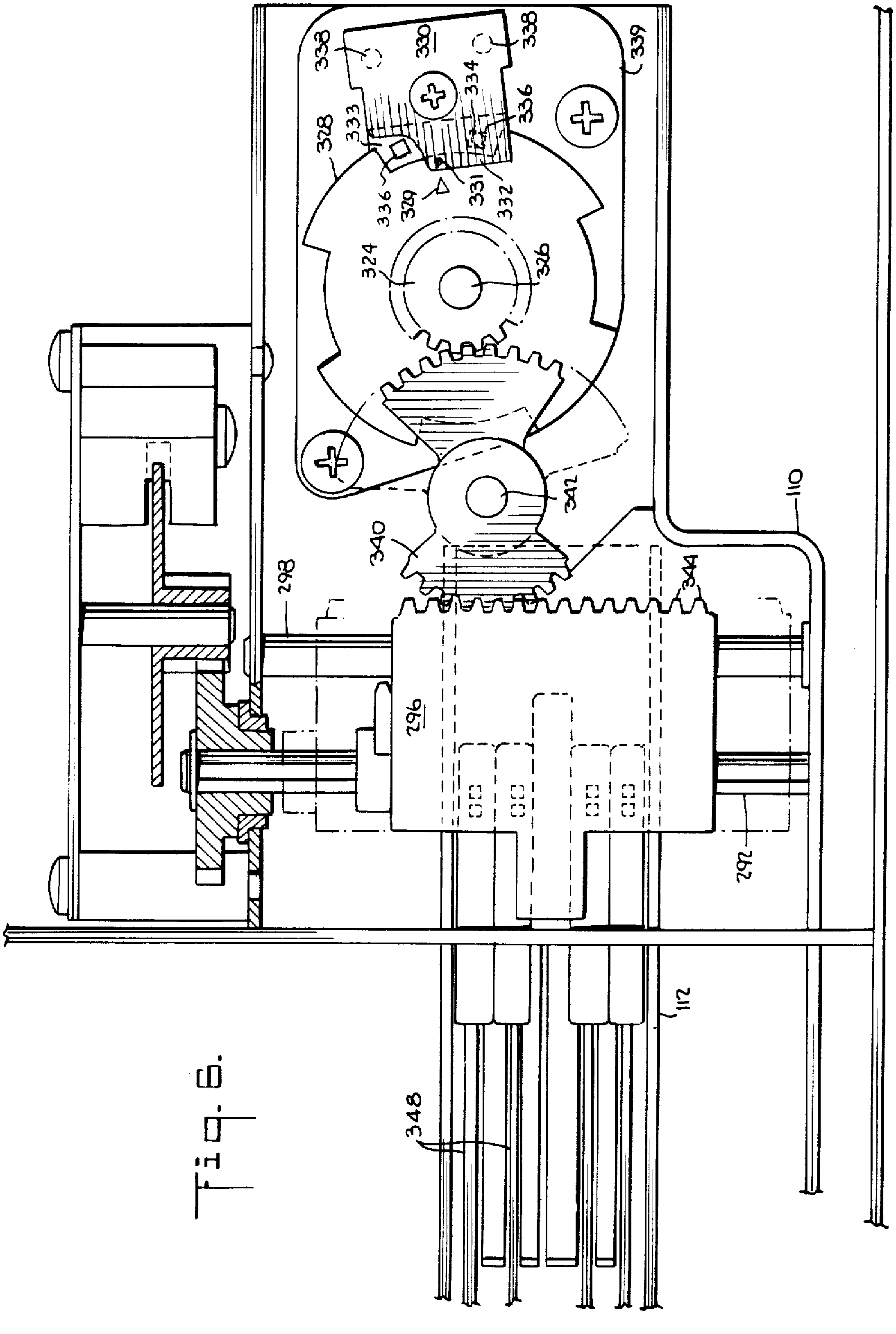
FIG. 6 is an enlarged view of a portion of the mailing machine shown in FIG. 5.

Referring now to FIGS. 5, 6 and 8, the die shelf extension bracket 110 rotatably supports a tri-lobe shaft 292 which is received within opposed openings 294 of a carriage 296 so that it may rotate therein without interference. The carriage 296 is slideably retained and guided by a pair of shafts 298 and 300 and has a slot 302 therein. A selector gear 304 is mounted on the tri-lobe shaft 292 and disposed within an opening 305 of the carriage 296. A gear 306 is secured to the trilobe shaft 292 outside of the die shelf extension bracket 110. The trip shaft 248 has a locking lever 308 that is receivable within the slot 302 of the carriage 296 and a gear segment 310 is mounted on the trip shaft 248 to be rotated thereby. The trip shaft 248 passes through clearance openings in the rectifier bracket 112. The carriage 296 has tooth forms 311 at the bottom thereof as seen in FIG. 8. These tooth forms 311 extend parallel to the shaft 292.

Referring now to FIGS. 5 and 6, mounted on the base 46 is a first electrical setting means in the form of a stepper motor 312 which has a gear 314 mounted on the output shaft 316 thereof. The gear 314 is in mesh with the gear 306 that is mounted on the tri-lobed shaft 292. Also mounted on the output shaft 316 of the stepper motor 312 is an optical encoder disk 318 that is received within a sensor 320 whereby the instantaneous position of the stepper motor shaft 316 can be determined.

A second electrical setting means in the form of a stepper motor 322 is mounted on the base 46 and has a gear 324 mounted on the output shaft 326 thereof. An optical encoder disk 328 is also mounted on the output shaft 326 for determining the angular position of the gear 324 and an alignment mark 329 thereon. Such determination is accomplished with an optical sensor 330 that has a pair of opposed plates or walls 332 and 333 that defined a space therebetween one wall 332 having an alignment mark 331 thereon. The optical encoder disk 328 is partially received within such opening. One wall 332 has a pair of light sources 334, (for example, light emitting diodes) and the other wall 333 has a pair of light responsive devices, such as photocells 336, aligned with the light sources. The housing of the optical sensor 330 has a pair of guide pins 338 extending therefrom that are received within measured openings of a mounting bracket 339.

A gear 340 is mounted on a shaft 342 and meshingly engages the stepper motor gear 324. The carriage 296 has teeth 344 thereon that are engaged by the gear 340 whereby the carriage may be laterally moved along the shafts 298 and 300 upon rotation of the gear 340. It will be appreciated that the optical encoder disk 318 and the sensor 320 are of the same construction as the optical encoder disk 328 and the sensor 330, respectively.

Figure 10:
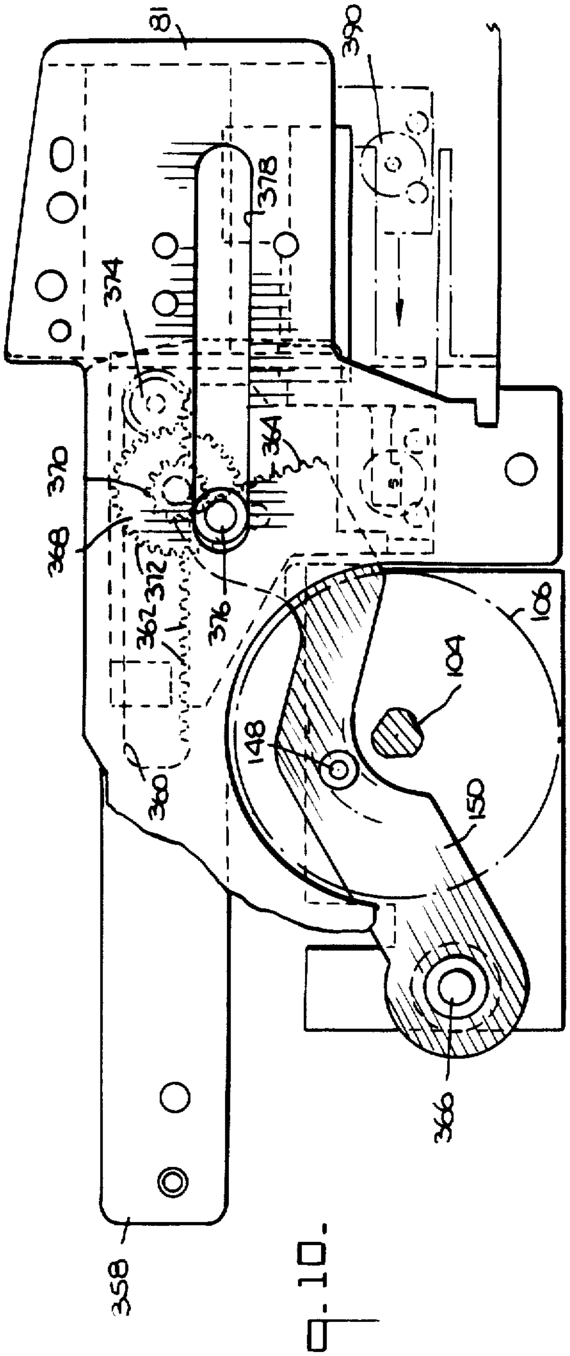
FIG. 10 is a cross-sectional view of a portion of the inking drive mechanism of the mailing machine shown in FIG. 1.
Figure 12:
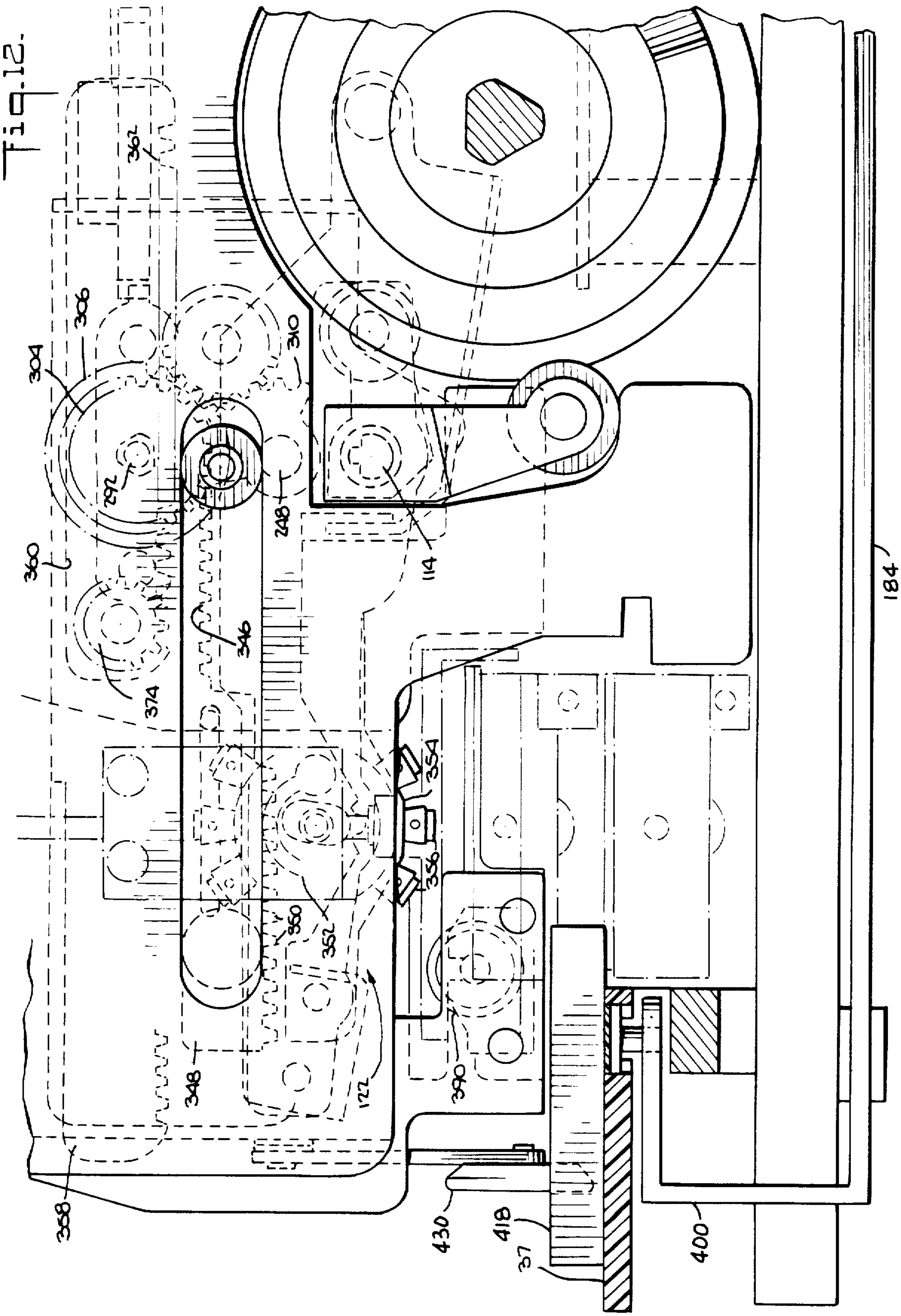
FIG. 12 is a detailed cross sectional view of the printing station of the mailing machine.

Referring now to FIGS. 8, 10 and 12, the shaft 292 is supported by the die shelf extension bracket 110 and has mounted thereon the gears 304 and 306. The gear 304 is engageable with the upper teeth 346 of four racks 348, which racks have lower teeth 350 at the other longitudinal end thereof. The lower teeth 350 of each rack 348 engage gears 352 that are integral with print wheels 354, there being a corresponding print wheel for each rack. The print wheels 354 have fonts 356 distributed about their perimeters, each font of each wheel being of a different number from 0 to 9.

An inker rack 358 has an elongated opening 360 therein with teeth 362 projecting into the opening. The inking arm 150 has teeth 364 at one end thereof and is mounted upon a shaft 366 at its other end for pivoting thereabout. With this structure, as the cam 106 is rotated by the shaft 104, the cam follower 148 on the inking arm 150 will cause the inking arm to pivot about the shaft 366 thereby arcately driving the teeth 364 with a reciprocating motion. A compounded gear 368 has a small diameter gear portion 370 and a large diameter gear portion 372, the small diameter portion 370 being engaged by the teeth 364 of the inking arm 150. The large diameter gear portion 372 engages a gear 374, which gear is in engagement with the teeth 362 of the inker rack 358. With such construction, as the inking arm 150 is pivoted the compound gear 368 will be rotated to rotate the gear 374 and the inker rack 358 will thereby be driven longitudinally in a reciprocal manner. The inker rack 358 also has a pin 376 thereon which is received within an opening 378 of the side frame 81 thereby providing support to the inker rack.

Referring now to FIGS. 13 and 14, a tie bar 380 (only one end thereof being shown) is integrally secured to the inker rack 358 and has end brackets 382 (only one shown) on opposite ends thereof. The end brackets 382 have slots 384 with a ridge 386 located at the open end of the slots. A roller housing 388 rotatably receives an ink roller 390 which has a shaft 392 extending therethrough. The ends 394 of the shaft 392 are received within lugs 396 located at opposite sides of the roller housing 388 and which are adapted to be received within the slots 384 to support the housing 388 within the tie bar 380. A slit 398 is located within each lug 396 to allow the shaft ends 394 to be received therein thereby rotatably supporting the ink roller 390 within the roller housing 388. It will be appreciated that any ink roller support structure may be used and the one described does not form part of the instant invention. It is included only for the purpose of illustrating the type of structure that may be used.

Referring now to FIGS. 11 and 19-24, a generally "L" shaped member 400 is integral with one end of the lever 184 and has an opening 402 that receives one end of an extension spring 404. The member 400 also has a leg 405 that extends parallel to the lever 184. The other end of the spring 404 is received within an opening 406 of a frame member 408. A post 410 is integral with a slid member 412 and received within an elongated opening 414 of the leg 405. The spring 404 exerts a force upon the lever 184 causing the lever to force the cam follower 178 against the cam surface 172 or the bearing member 176 against the cam surface 170 depending upon the angular posture of the cam 168. The slid member 412 has a T-shaped pusher 416 at its end opposite the post 410, which pusher has a wall portion 418 and a connector 420 that is received within a channel 422 of the base 46. A stub shaft 424 is secured to an arm 426 and is rotatably supported by the casting 216. A spring 428 is wrapped around the stub shaft 424 and has one end attached to the casting 216 and the other end engages the arm 426 to bias the arm in a downward direction so that a roller 430 which is rotatably attached to the arm by a pin 432 is urged downwardly onto the deck 37.

Figure 19:
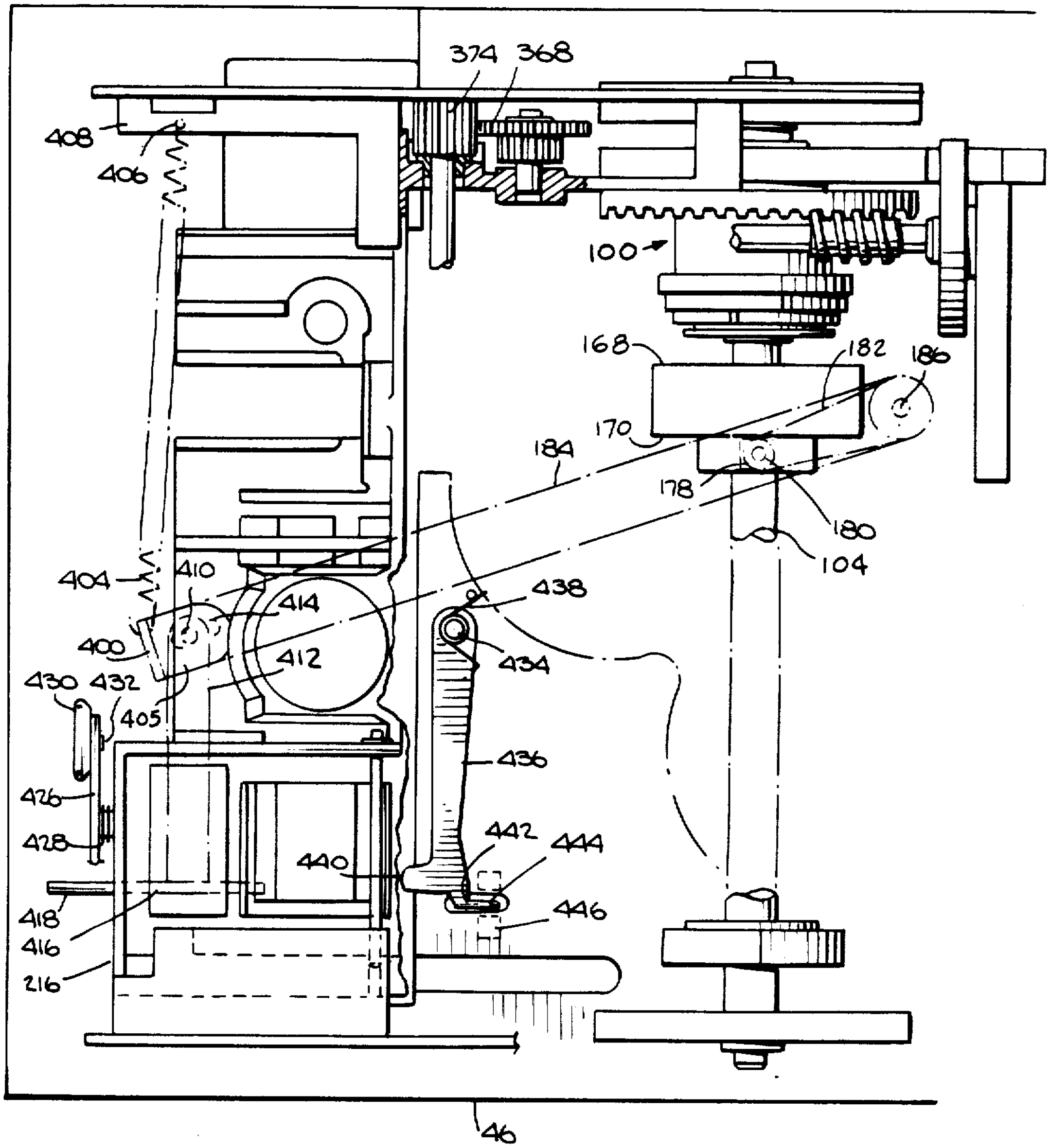
FIG. 19 is a cross-sectional view of a portion of the mailing machine showing the ejection mechanism.
Figure 20:
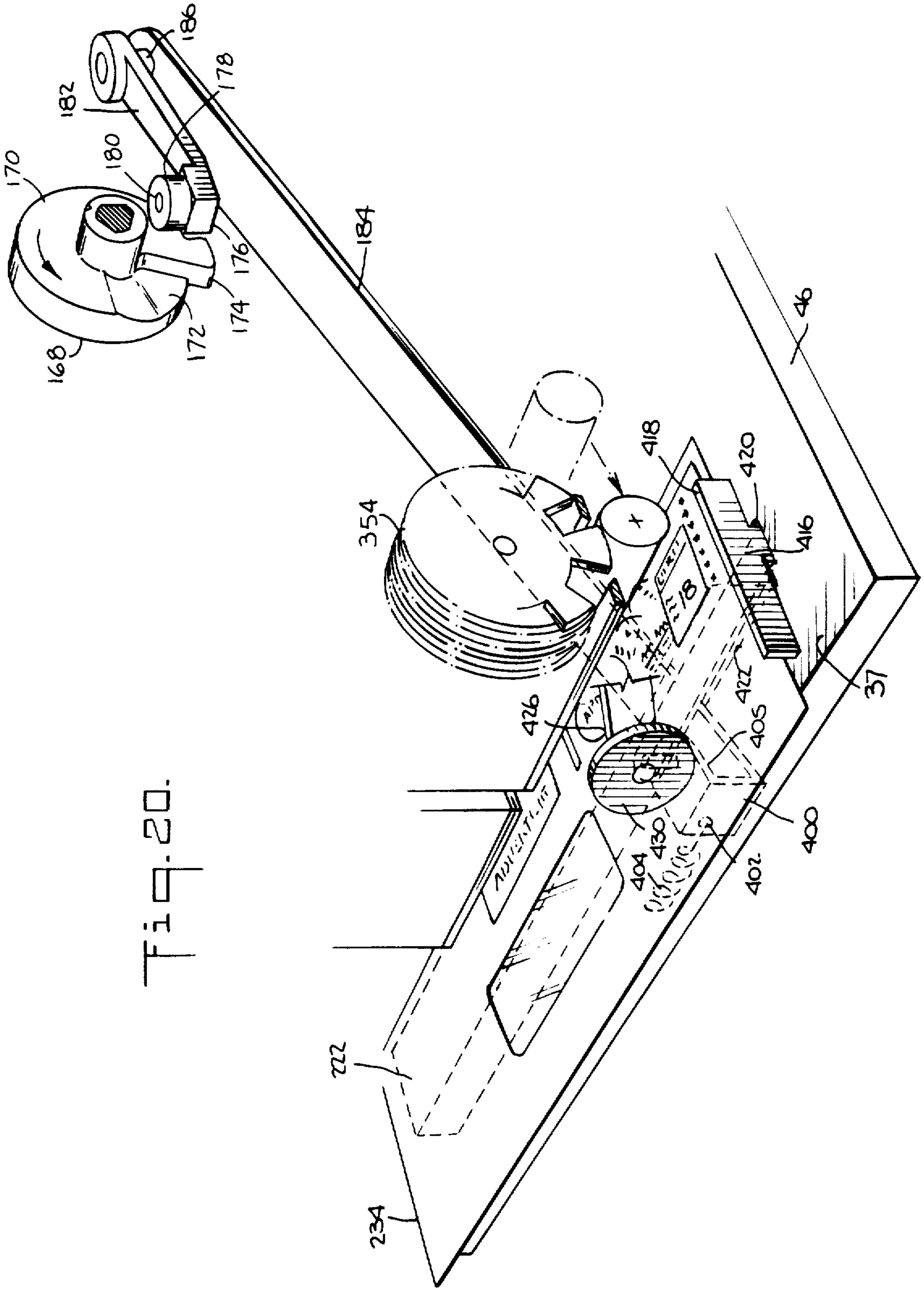
FIG. 20 is a perspective view of the envelope receiving slot of the mailing machine along with certain components associated therewith.
Figure 21:
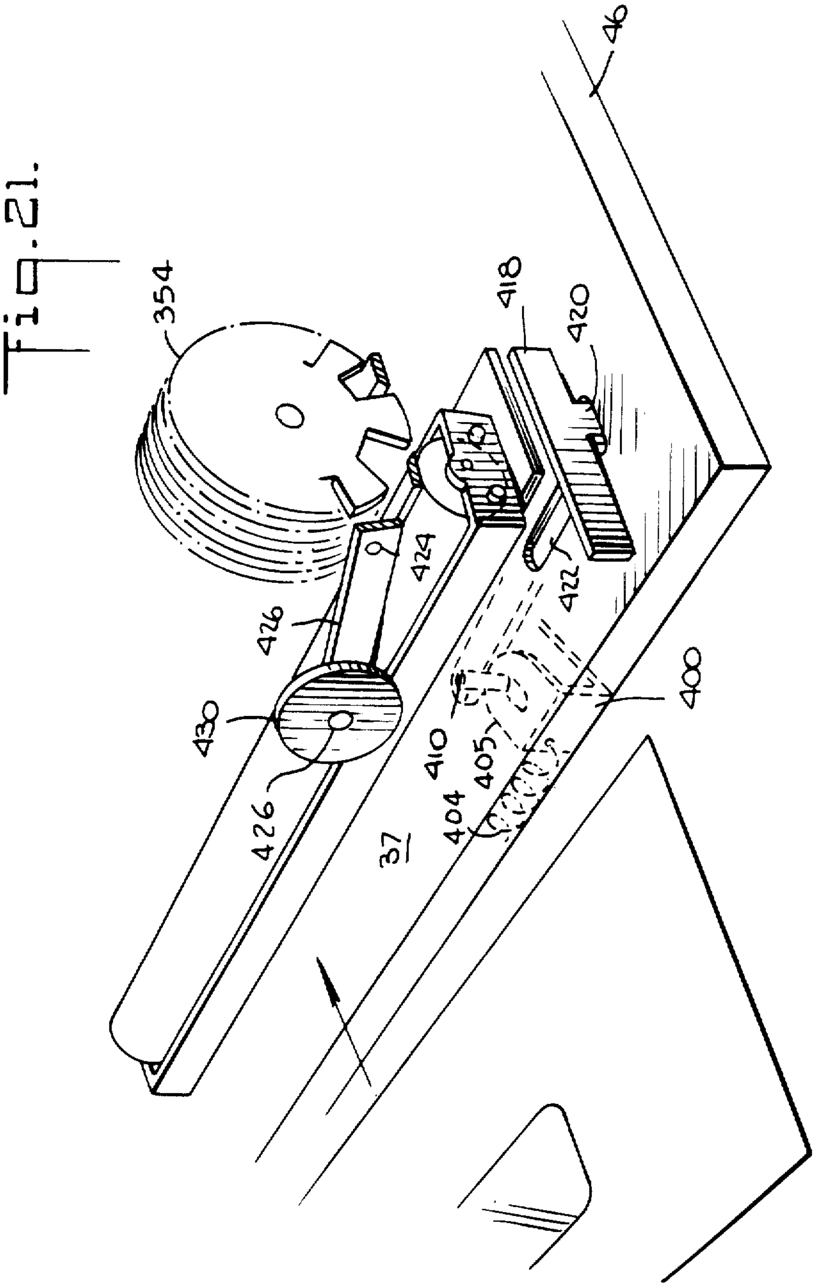
FIG. 21 is a perspective view of part of the ejector mechanism utilized with the mailing machine.

A pivot pin 434 mounted on the base 46 and pivotally supports a lever 436. A torsion spring 438 is secured at one end to the base 46 and engages the lever 436 at its other end to urge the lever in a clockwise direction as seen in FIG. 19. The lever 436 has a letter contacting tip 440 at one end thereof and a depending finger 442 opposed thereto that extends through an opening 444 in the base 46. A photosensor 446 is mounted on the logic bracket 49 and is in a position to receive the finger 442 when the lever 436 pivots in the counter-clockwise direction.

Figure 26:
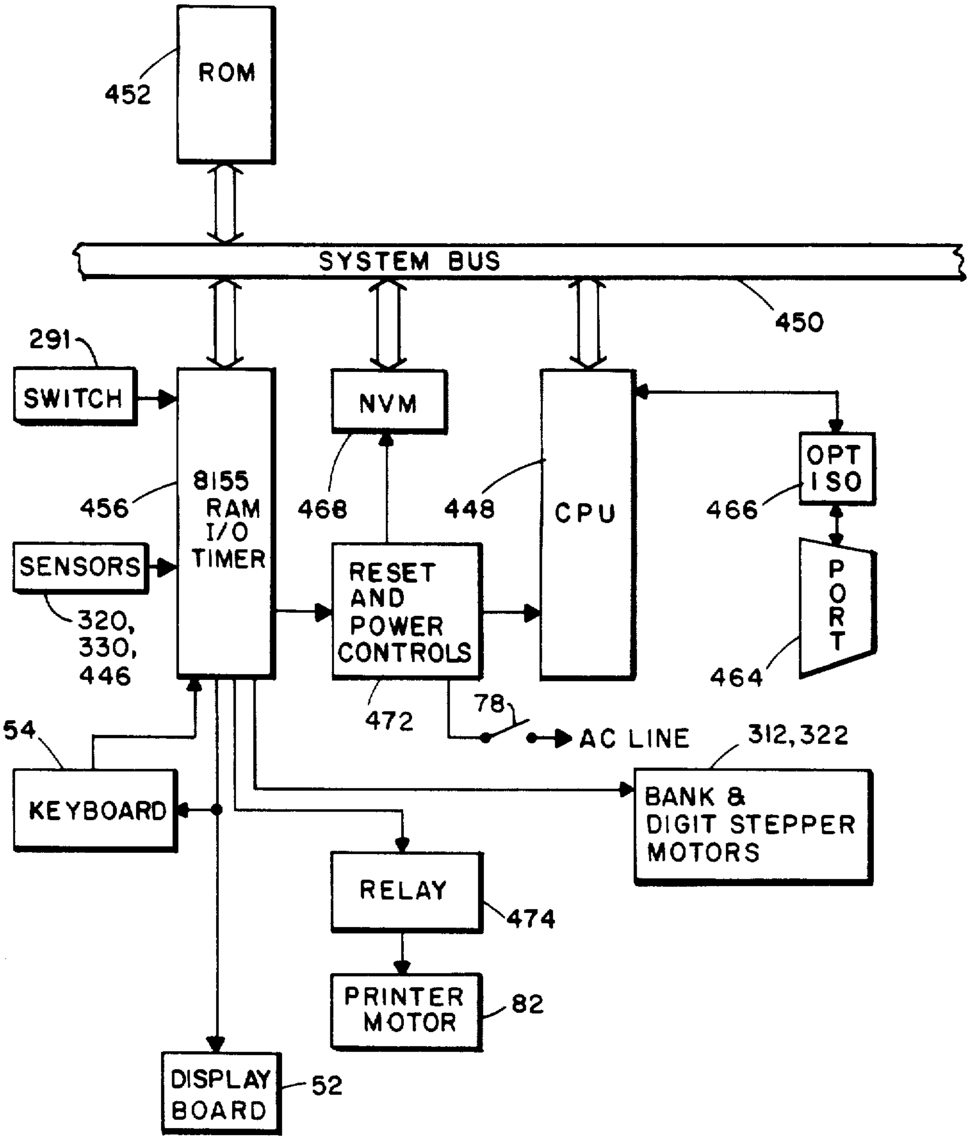
FIG. 26 is a block diagram of the electronic circuit of the mailing machine.
Figures 27, 27B:
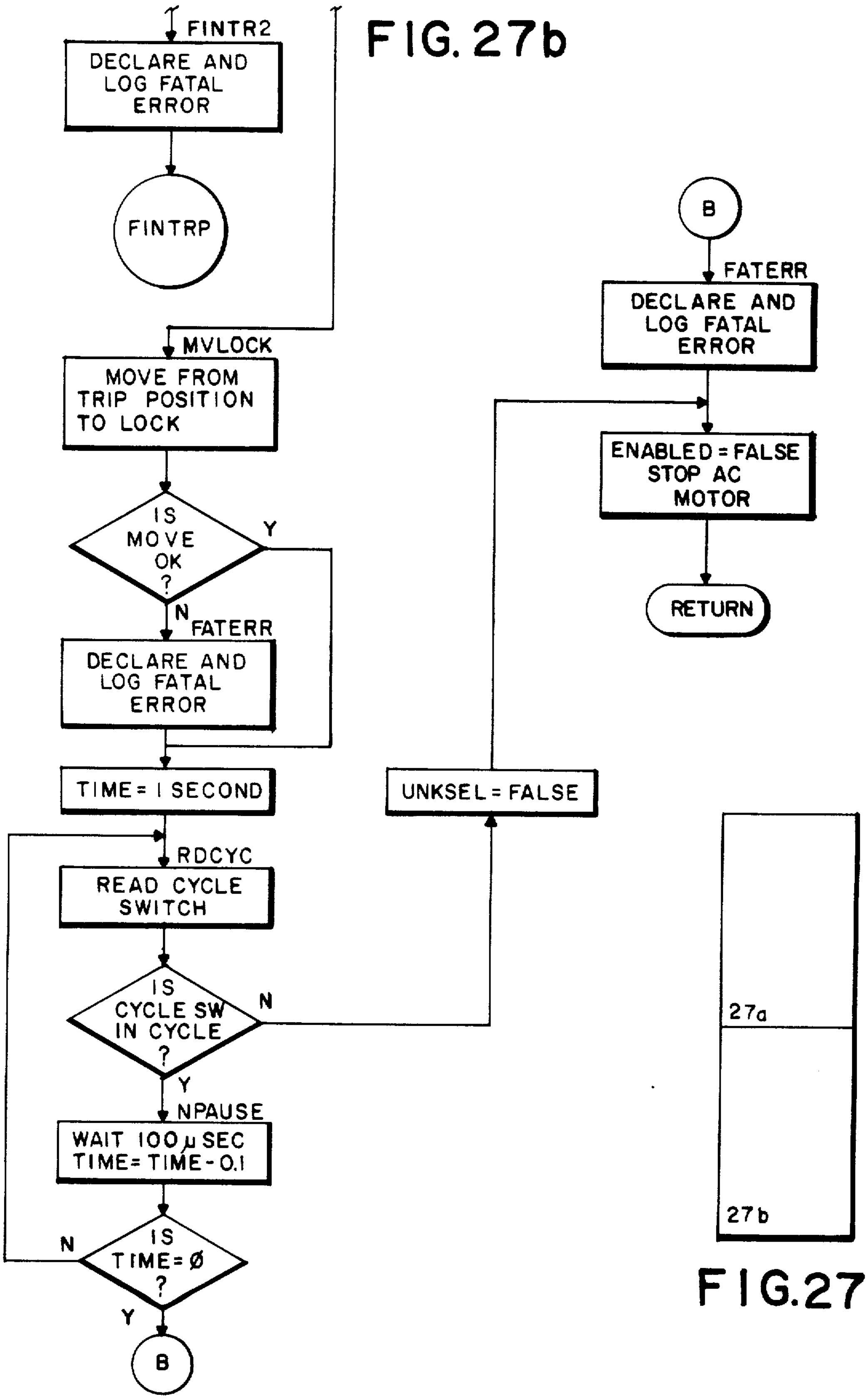
FIGS. 27, 27*a*, 27*b*, 28 and 29 are flow charts describing the operation of the mailing machine.
Figure 27A:
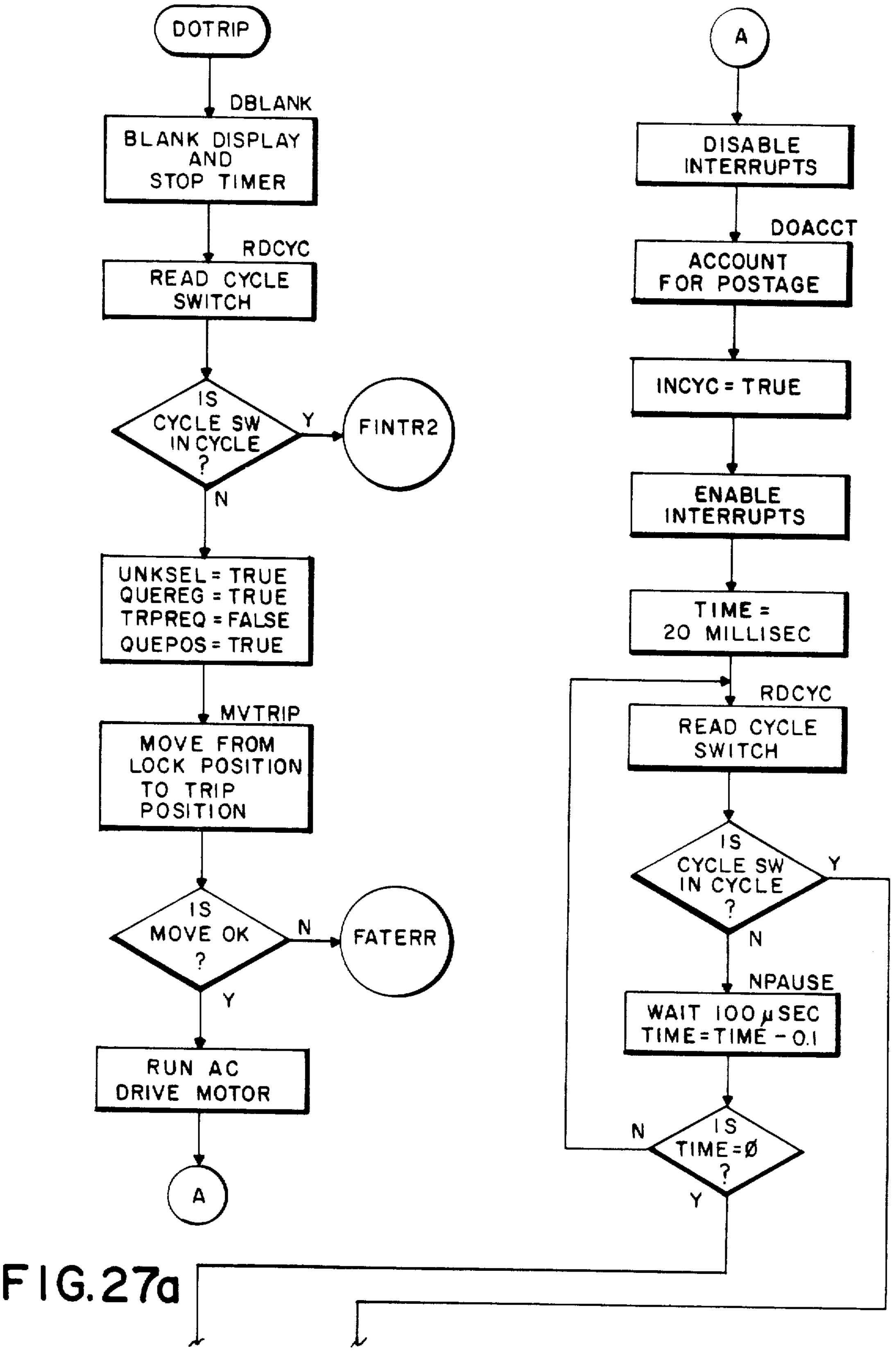
Figure 28:
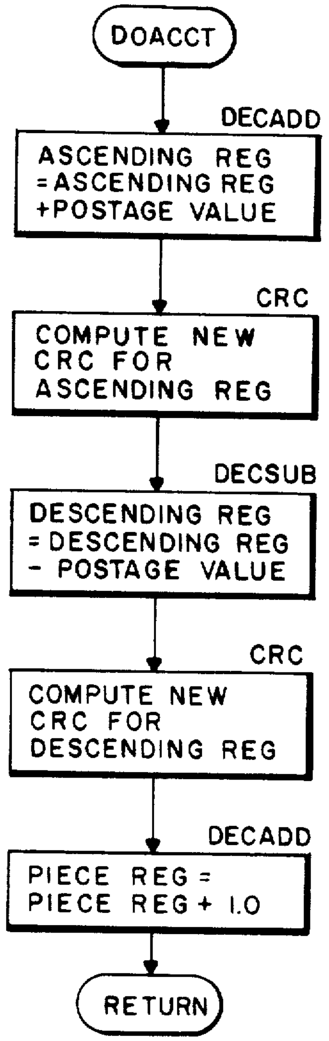
Figure 29:
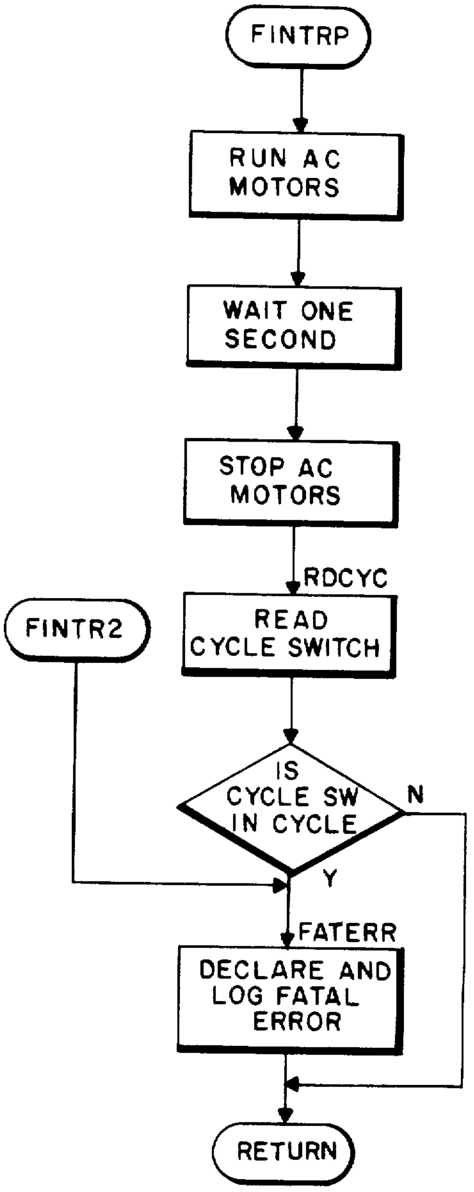
Figure 30:
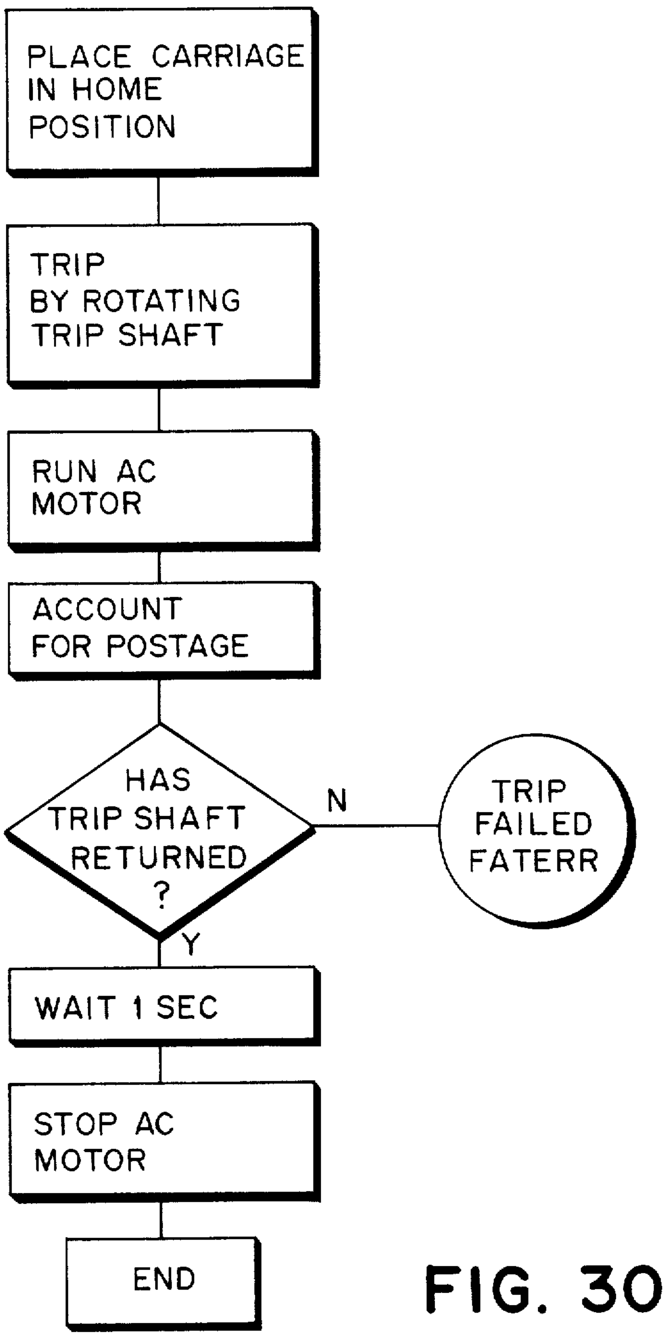
FIG. 30 is a flow chart describing one embodiment for postage accounting.

Referring now to FIG. 26, a block diagram is shown of the electrical circuit of the mailing machine and in FIGS. 27, *27a*, *27b* 28 and 29 a flow chart is shown that describes operation of the mailing machine 30. The electrical circuit includes an 8-bit microprocessor 448 (CPU), such as an Intel Model 8085 microprocessor, which controls the functions of the mailing machine 30 and is connected to various components of the electrical circuit through a system bus 450. The microprocessor 448 is in electrical connection with a ROM 452 through the system bus 450. The ROM 452 serves as an address latch that formats address signals and stores a series of programs for controlling the mailing machine 30. An integrated circuit 456, which may be an Intel Model 8155, is also connected to the system bus 450 and includes a RAM with input lines and output lines and a timer. The RAM 456 has memory space allocated for ascending register and descending register data for transcient storage. External communication data ports 464 are connected to the microprocessor 448 through optical isolators 466. These external communication ports allow connection with devices such as an electronic scale, a remote meter resetting system, servicing equipment and the like. Also in connection with the microprocessor 408 through the system bus 450 is the keyboard 54 and a non-volatile memory (NVM) 468. The stepper motors 312, 322 are also in electrical connection with the microprocessor 448 via the RAM 456 and bus 450 or reset controls 472. A reset and power control unit 472 is electrically connected between the RAM 456 and the microprocessor 448 and a relay 474 connects the motor 82 to the RAM 456.

Operation of the mailing machine 30 is shown basically in the flow chart shown in FIGS. 27, *27a*, *27b*, 28 and 29 which taken together with the description which follows describes in detail such operation.

Figure 4:
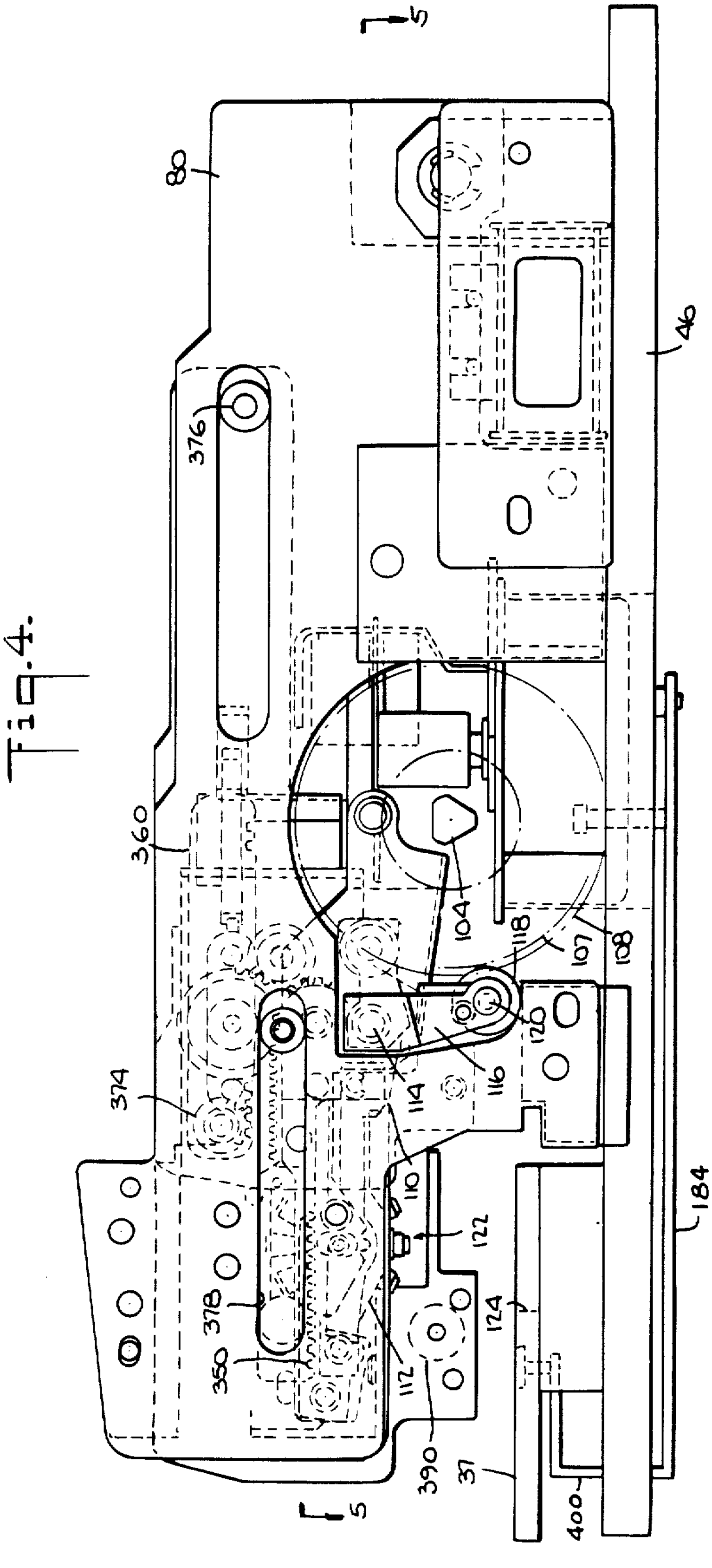
FIG. 4 is a longitudinal cross-sectional view of the mailing machine shown in FIG. 1.

The mailing machine 30 is first prepared for operation by turning on the power switch 78. Upon initial start-up, the check date indicator 76, an LED, on the display panel 40 will start flashing for the purpose of warning the operator to check the date for which the date printer 224 is set. This indicator 76 will flash a signal to indicate that the microprocessor 448 has disabled the mailing machine 30. The lid 34 would then be lifted by the operator to expose the date key 74 and the thumb wheels 75. The operator would then operate the thumb wheels 75 to change the date print wheels 225, if necessary, and would then depress the date switch key 74. Upon depressing the date key 74, the check data indicator 76 will be turned off and the display panel 40 will change to ≡0.00≡, the triple bars indicating that the mailing machine is ready for the input of postage information. At this time, the print head 122 is in the home position as indicated in FIG. 4 and the printing cams 106, 108 will be positioned to place the cam followers 148, 160 in locations so as to cause the print bracket 111 to raise the print head within the cover 32 away from the deck 37 so that it cannot be contacted or wiped to obtain an unauthorized impression. The carriage 296 and selector gear 304 will be located in the home position and the locking lever 308 will be located outside of the carriage slot 302 as seen in FIG. 8. In such position, the selector gear 304 is out of engagement with all the racks 348 (FIG. 5) which are locked in position by engagement between the upper rack teeth 346 and the tooth forms 311.

Postage values are selected by first entering the value through the numeric setting keys 56 of the keyboard 42. Such value selections are indicated at the display panel 40. The display board 52 may be set to zero by depression of the clear key 58 and then a new value may be entered. With the initial selection of the postage value completed, the select postage key 68 is depressed and the microprocessor 448 will cause the print wheels 354 to be set for the selected postage by controlling the stepper motors 312, 322. As a result of the select postage key 68 being depressed at the keyboard 54, a signal is sent to the microprocessor 448. The microprocessor 448 operates in accordance with a control program stored in the ROM 452 which is accessed over address lines. In accordance with the control program stored in the ROM 452, the microprocessor 448 accesses data stored in the RAM 456 over the system bus 450. The data in the RAM 456 represents positions for which the stepper motors 312, 322 had been set. Upon the microprocessor 448 accessing the RAM 456, the stepper motors 312, 322 are set relatively by the microprocessor 448 based on their present dispositions and the new positions to be assumed. Upon being so set data representations of the new positions of the stepper motors 312, 322 are supplied to and stored in the RAM 456.

Figure 15:
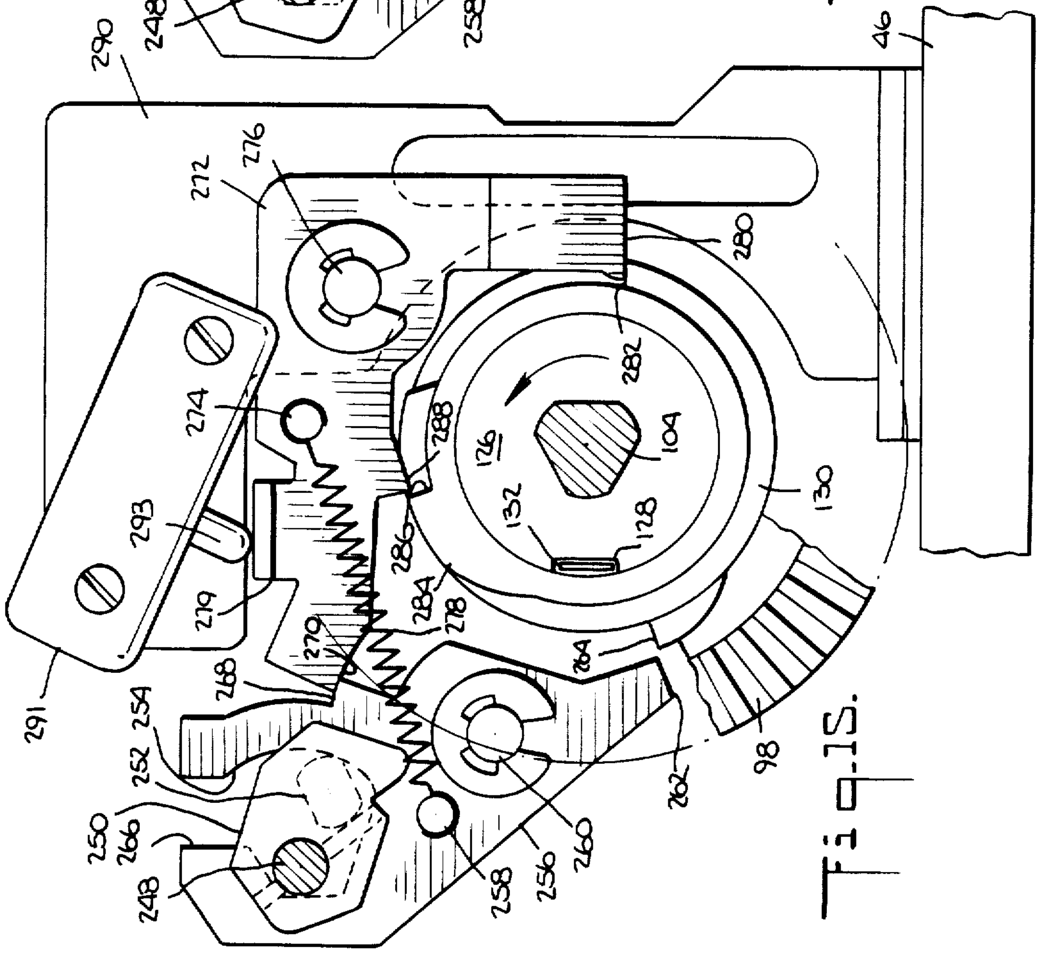

Prior to depression of the select postage key 68, the spring clutch 100 will be in the home position as shown in FIG. 15. At this time, the trip shaft 248 will be in a position such that the locking lever 308 is removed from the carriage slot 302 thereby freeing the carriage 296 for movement along the shaft 292.

As stated previously, selection of postage values is accomplished by the stepper motors 312, 322 through control of the microprocessor 448. The stepper motor 312 causes a selected print wheel 354 to be rotated while the other stepper motor 322 determines the bank to be acted upon by the stepper motor 312, the term bank including the rack 348, gear 352, print wheel 354 and other components associated with the rotation of a given print wheel. The microprocessor 448 will control the movement of the stepper motor 322 through the RAM 456 so that the selector gear 304 carried by the carriage 296 will address each bank in sequence. Movement of the carriage 296 is accomplished by incremented rotation of the gear 324 which in turn will rotate the carriage gear 340 thereby causing the carriage 296 to slide along the tri-lobe shaft 292. The position of the carriage 296 is determined by the optical sensor 330 that senses the angular displacement of the optical encoder 328 mounted on the output shaft 326 of the stepper motor 322. As each bank is addressed by the selector gear 304 through the stepper motor 322, the stepper motor 312 will be enabled through control of the microprocessor 448 to rotate the addressed print wheel 354 and place it into the position selected by the numeric setting keys 56. This rotation is caused by the rotation of the selector gear 304, by the stepper motor 312 via gear 306 and shaft 292, whose teeth engage the upper teeth 346 of the particular rack 348 being acted upon to move it longitudinally to the selected position. As the rack 348 is being moved, the lower teeth 350 will cause rotation of the print wheel 354 through interaction with the gear 352. After a print wheel 354 is set into its selected position, selector gear 304 is moved by the carriage 296 onto the next bank until the entire print head 122 has been set.

Each stepper motor 312, 322 is provided with a two channel optical encoder 318, 328, respectively, to permit the microprocessor 448 to determine the setting of the print wheels 354 and position of the carriage 296, respectively, and to detect unauthorized wheel movements. With the two channel encoder 318, 328 a determination can be made of the direction of rotation of the stepper motor by the sequence in which the lights 334 are exposed. It will be noted that the sensor 330 has a pair of pins 338 thereon that are adapted to fit with openings of the mounting bracket 339. In this way, proper alignment of the optical sensor 330 is assured. The upper wall 332 of the sensor 330 has a mark 331 thereon that is used for the purpose of setting the optical encoder disk 328. This is accomplished by aligning the mark 329 on the optical encoder disk 328 when the encoder disk 328 is loosely mounted upon the shaft 326. The respective stepper motor 322 would be operated so that the shaft 326 is in an incremental position. With this setting of the shaft 326 the loosely fitting encoder disk 328 would be rotated on the shaft 326 so that the mark 329 is aligned with the mark 331 on the wall 332 of the sensor 330. With this alignment completed, the encoder disk 328 would be secured to the shaft 326 so as to be rotated therewith. Of course, with such alignment of the mark 329, the stepper motor is in the home position. The encoder disk 318 and sensor 320 associated with the stepper motor 312 would be assembled in the same manner.

Figure 16:
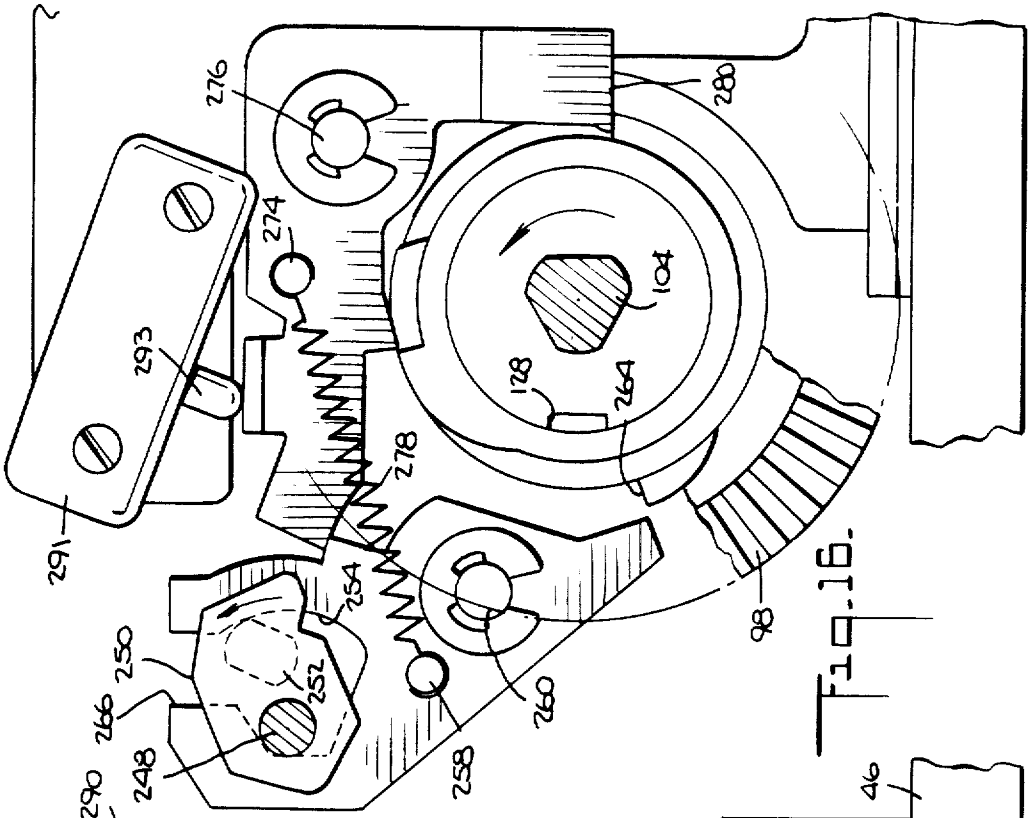
FIGS. 15-18 are cross-sectional views of the single revolution clutch incorporated in the mailing machine, shown in different stages of operation.

After the print wheels 354 are placed in their appropriate position as described, the carriage 296 will be placed in its home position as seen in FIG. 8. The microprocessor 448 would cause the stepper motor 312 to rotate the trip shaft 248 slightly and place the spring clutch 100 in the locked position as shown in FIG. 16. In such locked position, the locking lever 308 would enter the slot 302 to lock the carriage 296. Simultaneously, the tooth forms 311 would engage the upper teeth 346 of the racks 344 thereby locking the print wheels 354 at the selected values. An envelope 234 to be stamped would be placed into the slot 36 and its presence sensed by the photosensor 446. This is occasioned by an envelope 234 being pushed against the top 440 of the lever 436 with sufficient force to overcome the spring 438 and position the switch finger 442 within the photosensor 446. Immediately thereafter, the drive motor 82 will be started and the stepper motor 312 will be enabled to rotate the optical encoder 318 and the trip shaft 248.

Referring now to FIGS. 7, 8 and 15–18, in FIG. 15 the trip shaft 248 is shown in its home position, i.e. in this position the pivot member 256 is in a position such that the shoulder 268 is contacted by the end 270 of the pivot member 272 and the bearing surface 280 is in engagement with the shoulder 282. In such position, the spring 132 would be held loosely about the slidable member 126. No movement can be imparted from the disc gear 98 to the slidable member 126 because of the posture of the spring 132. Consequently, the shaft 104 can have no drive imparted thereto. When the clutch 100 is in such position, the print wheels 354 may be rotated so as to adjust the settings on the print head 122. As the trip shaft 248 begins to rotate, the bar 252 begins to slide upon the curved surface 254 and will first assume the locked position as shown in FIG. 16. In this locked position, the components of the single revolution clutch 100 still occupy the same status as in the home position with the exception that the trip shaft 248 is in a position whereby the locking lever 308 is received with the carriage slot 302 to lock the carriage 296 and the racks 348 as previously described.

Figure 18:
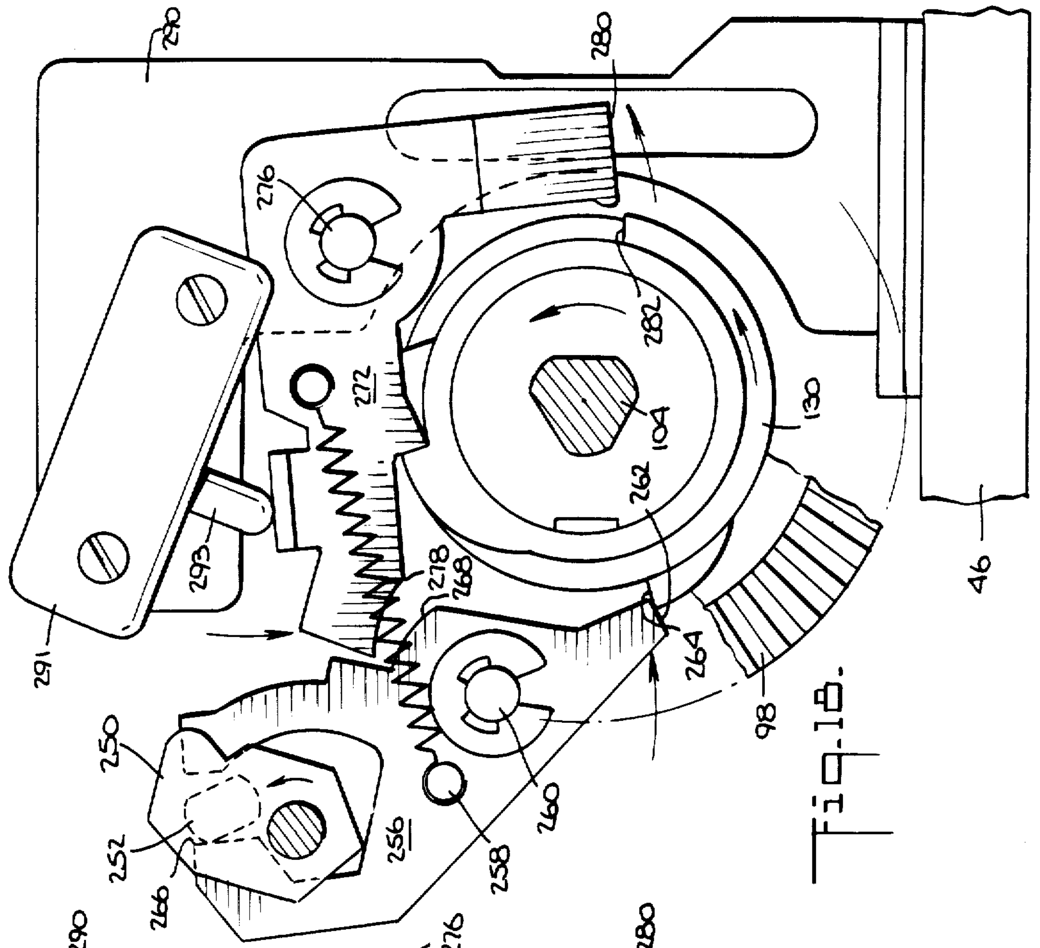
Figure 17:
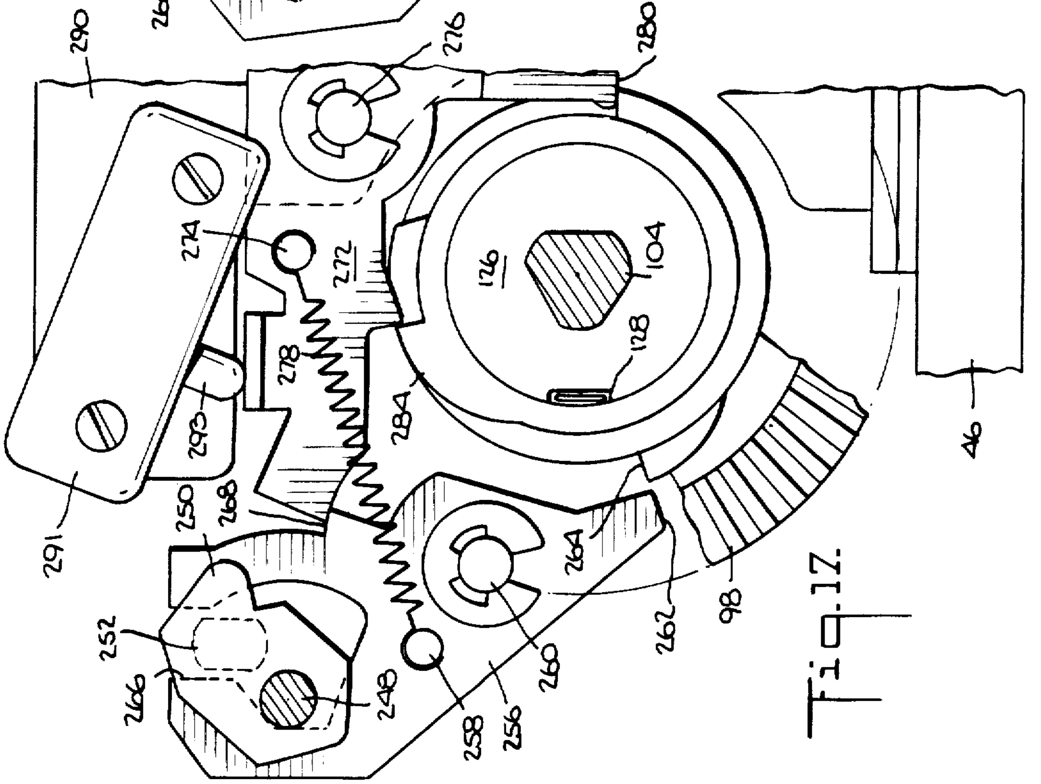

Following the locking of the carriage 296, upon a slightly greater rotation of the trip shaft 248, the bar 252 will then become disengaged from the surface 254 and the pivot member 256 is free to be rotated. Upon further rotation of the trip shaft 248, the bar 252 will contact the bearing surface 266 thereby causing the pivot member 256 to rotate about the shaft 260 in a counterclockwise direction as seen in FIG. 18. The contact between the bar 252 and the pivot member is instantaneous, i.e., only sufficiently long to allow rotation of the pivot member. With this occurrence, the pivot member 272 is rotated about the shaft 276 in a counterclockwise direction by the action of the extension spring 278 so that the bearing surface 280 is driven out of engagement with the shoulder 282 and the pivot member 256 engages the abutment surface 264 to prevent movement of the driven member in the clockwise direction. This will free the confiner 130 for rotation in the counterclockwise direction and the spring 132 will wrap about the gear 98 and slidable member 126 thereby providing drive connection therebetween so that the drive from the gear 98 is imparted to the slidable member 126 and confiner 130. As the slidable member 126 begins to rotate, the pivot members 256 and 272 follow various cam surfaces of the confiner 130. This will continue until the shaft 104 has made a full revolution at which time the bearing surface 280 of the pivot member 272 will be engaged by the shoulder 282 as a result of the trip shaft 248 being rotated to disengage the bar 252 from the surface 266 and the spring 278 thereafter rotating the levers 256, 272 in a counterclockwise direction. Thereafter, the spring 132 will be acted upon to allow free wheeling between the slidable member 126 and the gear 98. With such actuation of the clutch 100, a postage printing operation will have been completed as will be described in greater detail hereinafter.

The completion of a printing cycle is indicated by the switch 291. Near the end of the printing cycle, the depending member 288 would ride upon the projecting portion 284 thereby rotating the pivot member 272 in a clockwise direction. This will drive the bearing surface 279 into engagement with the actuator 293 to actuate the switch 291. Upon actuation, the switch 291 would send a signal to the microprocessor 448 to indicate the completion of the cycle and the microprocessor will send a signal to charge the postage used in the printing by reducing the amount of postage stored in the RAM 416. The microprocessor 448 will also clear the mailing machine 30 so that it is ready for another operation.

Referring to FIGS. 5, 6, 8 and 15–18 an alternative way of determining a printing cycle has taken place for purposes of accounting would be through the optical sensor 320 associated with the encoder disk 318 of the stepper motor 312. With the carriage 296 in the neutral postion and the gear 304 engaged with the gear segment 310 a signal is sent by the sensor 330 to the microprocessor 448 communicating the carriage location. The trip shaft 248 is rotated in a first direction by the stepper motor 312 through the segment gear 310 and placed in the locked position. Upon completion of the printing cycle, the trip shaft 248 would be returned to the home position and the output shaft 316 would be rotated in the opposite direction. Such movement may be observed by the sensor 320 which would send a signal to the microprocessor 448 to indicate the end of a print cycle. Confirmation that rotation has taken place is transmitted by the two photodetectors 325 which in cooperation with the two lights 323 can not only determine that the disk encoder 328 is being rotated by the output shaft 326 of the bank stepper motor 322 but also in which direction. In the mode of operation herein described when the rotation of the output shaft 316 is in a first direction, the microprocessor 448 controls the printing operation and will charge the appropriate postage amount. Upon rotation of the output shaft in the opposite direction, the microprocessor 448 will clear the system for additional operations.

During a single revolution of the shaft 104, a number of activities occur. The cams 106, 108, 166 and 168 will be rotated by the shaft 104. With the rotation of the cams 106 and 108, the cam followers 154 and 160 will be driven within the cam tracks 152, 158 respectively. The bearing member 176 and cam follower 178 will be driven along the cam surface 170.

Focusing initially on the print head 122, as was stated previously, when the clutch 100 is in the static condition, the print head is in a raised position so it cannot be contacted to obtain an unauthorized stamp or impression. As the single revolution clutch 100 is actuated, the shaft 104 will rotate and the cams 106, 107 and 108 will be rotated therewith. The cam follower 120 will cause the lever 116 to be slightly rotated in a counterclockwise direction. With this occurrence, the print wheel bracket 111 will be lowered to expose the print head 122 and place it in a position whereby the print head may be contacted by the ink roller 390. Upon further rotation of the cam 107 the print bracket 111 will be lifted and then lowered again to be in a position to contact an envelope 234 on the platen 222 when lifted thereby.

As the print bracket 111 is being lowered a second time, the platen assembly 214 is being lifted. This is accomplished by the cam followers 154, 160 following the cam tracks 152, 158, respectively, of the print cams 106 and 108. With such movement, the print arms 156, 162, will be moved upwardly thereby moving the platen arms 196, 198 through the interaction of the tension springs 204, 210. As the printing cams 106, 108 rotate, the platen arms 196, 198 will be thereby carrying the platen bracket 220 upwardly with the foam rubber platen 222 therein. As the platen bracket 220 is lifted, the stripper bracket 232 contacts the casting 216 to be driven downwardly as the leaf spring 236 is overcome. Assuming an envelope 234 is located on the platen 222, it will be driven into engagement with the now lowered print head 122 for the printing of postage thereon. The presence of the torsion springs 204, 210 provides compensation for variation in thickness. If a thin envelope is to be stamped, the normal biasing forces of the springs 204, 210 are sufficient to allow printing to occur. On the other hand, if a thick envelope 234 is to be stamped, the springs 204, 210 will yield to accommodate the same. The tension of the springs 204, 210 should be approximately 20 to 40 lb.-in., the tension of the springs of the illustrated machine 30 being 27 lb.-in. As the print bracket 220 is lowered, the stripper bracket 232 will fall and the lip 233 will engage the envelope 234 thereby stripping the same from the print head 122, in case the envelope should stick thereto.

In addition to the printing operation, the inking operation also occurs during the operation cycle as the single revolution clutch is accuated. This is accomplished by the cam follower 148 following the channel 146 within the cam 106. As the cam 106 rotates, the inking arm 150 will be pivoted about the pin 366 thereby causing the teeth 364 to engage the gear small portion 370 and rotate the compound gear 368. The large diameter portion 372 of the compound gear 368 is in engagement with the gear 374 which in turn engages the teeth 362 of the inker rack 358. With such movement of the arm 150, the the inker rack 358 will be moved longitudinally by interaction of the components herein described. As the inker rack 358 is longitudinally moved, the ink roller 390 will be rolled across the lowered print head 122, which lowering was previously described, prior to the platen bracket 220 being moved upwardly. The ink roller 390 will be rolled across the print head 122 and will come to rest while the print head moves upwardly and then downwardly again to engage the platen as described previously. As the platen bracket 220 is lowered after printing, the inking arm 150 will begin to move in the other, or clockwise, direction thereby causing the inker rack 358 to move in the opposite longitudinal direction and cause the ink roller 390 to approach its rest or home position.

Still another activity that takes place as the spring clutch 100 is rotated a single revolution, is that the cam follower 178 will ride upon the cam surface 172 thereby overcoming the spring 404 and causing rotation of the lever 184 about the stub shaft 186. The cam surface 172 has an irregular configuration that rises to meet the cam surface 170 whose dimension is constant. The cam follower 178 will ride on such cam surface 170 but as the cam 168 continues to rotate the step 174 will engage the bearing member 176. Because the step 174 has a greater radius than the cam surface 170, the bearing member 176, whose linear dimensions are substantially equal to the diameter of the cam follower 178, will contact the step 174. In this way, as the cam 168 rotates, the cam follower 178 will lose contact with the surface 170 immediately before the upstream end of the bearing member 176 meets the downstream end of the step 174. The T-shaped pusher 416 is returned to its home position as the cam 168 begins to rotate and the cam follower 178 moves along the cam surface 172. The T-shaped member 416 will be at and remain in its home position while the cam follower 178 moves along the cam surface 170 at which time as the printing operation is occurring. Upon completion of printing, the bearing member 176 will engage and fall from the step 174 thereby causing the spring 404 to instantaneously exert a force upon the upright member 400 and pivot the lever 184 about the stub shaft 186. The wall portion 418 will accelerate to eject a envelope 234 from the mailing machine 40. While the T-shaped pusher 416 is in its home position, the roller 430 will be resting upon the envelope 234 and the spring 428 will cause a biasing force to be imposed by the roller 430 onto the envelope 234. As a consequence, when the T-member 416 begins to drive the envelope 234 across the slot 36, the roller 430, will impose sufficient force upon the envelope 234 and its contents so that they will move in unison. This has the advantage in that the initial impact of the T-shaped pusher 416 is not absorbed as a result of the envelope contents remaining static and the envelope 234 moving relative thereto. By moving the envelope 234 in unison with its contents, it has been found that an envelope 234 will derive the full force of impact upon ejection but if the contents remain static, i.e., they move within the envelope, the T-shaped pusher 416 will have lost much of its force by the time it engages the static contents and will not have sufficient force remaining to eject the envelope 234 from the slot 36. By having a bearing member 176 engaging the step 174 instead of the cam follower 178, it has been found that the full force of the spring 404 is utilized. The rectangularly shaped member 176 drops more quickly at the step 174 then a circular cam follower which would tend to roll over the step.

Figure 25:
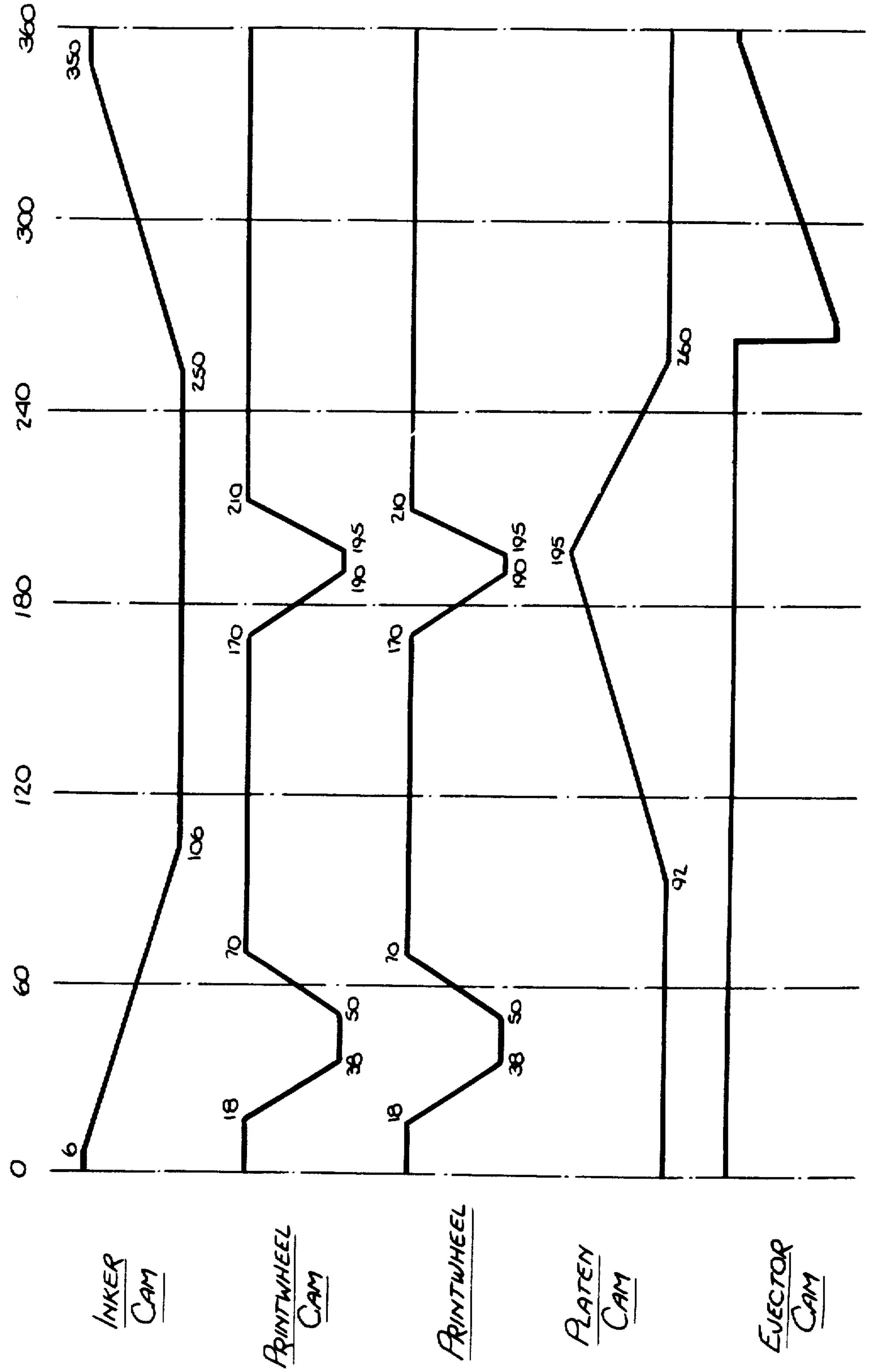
FIG. 25 is a timing chart indicating the sequential operations of certain units of the mailing machine.

The various activities and their relationship to one another are shown graphically in FIG. 25. The abscissa represents the angle of the spring clutch 100 relative to its home position and the ordinate indicates the component whose function is being represented. No activity takes place during the first six degrees of rotation. At 6° the ink roller 390 begins to move toward the print head 122. At 18° the print head 122 starts to move downwardly and between 34° and 50° the ink roller 390 rolls across the print head 122 to ink the same. Between 50° and 70° the print head 122 will move upwardly as the ink roller 390 continues to move in the same direction so as to clear the print head and avoid interference therewith. At 106° the ink roller 390 will be at a rest position, the position it will assume during printing of an envelope 234. The ink roller 390 will stay in such rest position between 106° and 250°. When the spring clutch 100 has rotated to the point where it is 92° from its starting position, the platen 222 will begin to rise. Between 170° and 190° the print head 122 will start descending once more and will remain lowered between 190° and 195°. At 195° the platen 222 will engage the print head 122 to perform the printing operation. Thereafter, the print head 122 will be lifted until it has returned to its home position at 210° and the platen 222 will be lowered until it reaches its home position at 260°. Meanwhile, the ink roller 370 at 250° will start to move in the opposite longitudinal direction to return to its home position and will reach that status by 350°. At 262° the bearing surface 176 will fall down the step 174 to actuate the ejection mechanism to discharge the stamped envelope 234 from the slot 36. Thus a full print cycle will have taken place.

Referring to FIG. 26, one arrangement of the major electronic components of an electronic mailing machine 30 embodying the present invention is shown. The electronic mailing machine 30 is controlled by the microprocessor 448 operated under control of a series of programs stored in the ROM 452. The microprocessor 448 accepts information entered via the keyboard 54 or via the external communication ports 464 from external message generators. Critical accounting and other information is stored in the non-volatile memory 468. The non-volatile memory 468 may be an MOS semiconductor type memory, a battery augmented CMOS memory, or other suitable non-volatile memory component. The function of the non-volatile memory 468 is to store critical postage meter data during those times when power is not applied to the mailing machine 30. This data may include, in addition to the serial number of the mailing machine 30, information as to the amount of the descending register (the amount of postage available for printing), the value of the ascending register (the total amount of postage printed by the meter), and the value of the piece count register (the total number of cycles the meter has performed), as well as other types of data, such as service information, which are desired to be retained in the memory even though no power is applied to the meter.

When the on/off power switch 78 is turned on causing the power supply internal to the mailing machine 30 (such as +5 V) to energize the microprocessor 448 and the balance of the electronic components of the mailing machine. The information stored in the non-volatile memory 468 is transferred via the microprocessor 448 to the RAM 458. The RAM 458 after power up contains an image or copy of the information stored in the non-volatile memory 468 prior to energization. During operation of the mailing machine 30, the data in the RAM 458 is modified. Accordingly, when postage is printed, the descending register will be decremented, the ascending register incremented and the piece counter register incremented. When the power switch 78 is turned off, the updated data in the RAM 456 is transferred via the microprocessor 448 back into the non-volatile memory 468. The data is transferred into a suitably prepared area of the non-volatile memory 468. Thus, the non-volatile memory 468 is updated during the power down cycle when the power switch 78 is turned off. A like transfer of information between the non-volatile memory and the RAM 458 takes place during uncontrollable power failure.

The remote resetting function is performed by first lifting the lid 34 and entering the remote resetting authorization number upon pressing the appropriate key 70. When calling an RMRS Status Center, this information, plus the postage amount desired, is entered through a telephone whereupon a coded combination is received. The operator enters the postage desired, then presses the RMRS enter amount key 72. The operator then enters the combination received from the Status Center and presses the RMRS enter combination key 73. Thereafter, the new postage unused value will be displayed, and the mailing machine 30 is ready for normal operation.

What is claimed is:

1. A self-contained electronic mailing machine having means for determining completion of a postage printing operation, comprising: a housing, a microprocessor received within said housing, a platen movably supported within said housing, a print head supported within said housing spaced from and addressing said platen, a single revolution clutch located within said housing, means connected to said single revolution clutch for moving said platen into printing engagement with said print head, a shaft rotatably supported within said housing, means for rotating said shaft, said shaft being in engagement with said single revolution clutch whereby upon rotation of said shaft, said single revolution clutch causes said moving means to move said platen into contact with said print head means connected to said microprocessor for sensing the rotation of said shaft, whereby upon rotation of said shaft said sensing means will sense the rotation of said shaft and send a signal to said microprocessor to communicate the activation of said single revolution clutch and the completion of a printing operation.

2. A self-contained electronic mailing machine having means for determining completion of a postage printing operation, comprising: a housing, a microprocessor received within said housing, a platen movably supported within said housing, a print head supported within said housing spaced from and addressing said platen, said print head having a plurality rotatable print wheels axially aligned with one another, each of said print wheels having a gear, a stepper motor in electrical connection with said microprocessor and supported within said housing, said stepper motor having a output shaft with an encoder disk attached thereto, a sensor in electrical connection with said microprocessor, said sensor receiving said encoder disk therein; a plurality of racks supported within said housing, selector means movably mounted within said housing to selectively engage said stepper motor with one of said racks, each of said racks engaging a print wheel gear, a single revolution clutch located within said housing, means connected to said single revolution clutch for moving said platen into and out of printing engagement with said print head upon activation of said single revolution clutch, means connected to said output shaft for activating said single revolution clutch, whereby upon rotation of said stepper motor output shaft said single revolution clutch will be activated and said sensor will sense the rotation of said disk and send a signal to said microprocessor to communicate the activation of said single revolution clutch.

3. The mailing machine of claim 2 wherein said selector means includes a selector shaft supported within said housing, said selector shaft having a carriage slidably mounted thereon and a first gear secured thereto, a second gear slidably mounted on said selector shaft slidably engaged by said carriage, said second gear being selectively engageable with said racks.

4. A self-contained electronic mailing machine having means for communicating the completion of the printing of postage upon an envelope, comprising: a housing having a slot therein, a microprocessor received within said housing, a platen movably supported within said housing to move into and out of said slot, a print head movably supported within said housing spaced from and addressing said platen, said print head having a plurality of rotatable print wheels axially aligned with one another, each of said print wheels having a gear secured thereto, a stepper motor in electrical connection with said microprocessor and supported within said housing, said stepper motor having an output shaft with an encoder disk attached thereto, a sensor in electrical connection with said microprocessor, said sensor receiving said encoded disk therein; a plurality of racks supported within said housing, selector means movably mounted within said housing to selectively engage said stepper motor with one of said racks, each of said racks engaging a print wheel gear, said selector means having a neutral location wherein said stepper motor is out of engagement with all of said racks, means in electrical connection with said microprocessor for notifying said microprocessor that said selector means is in said neutral position, a single revolution clutch located within said housing, means connected to said single revolution clutch for moving said platen into printing engagement with said print head upon activation of said clutch, means connected to said output shaft of said stepper motor for activating said single revolution clutch when said selector means is in said neutral position whereby upon rotation of said stepper motor output shaft when said selector means is in said neutral position said activating means will activate said single revolution clutch and said sensor will sense the rotation of said encoder disk and send a signal to said microprocessor to communicate the activation of said single revolution clutch and the completion of a postage printing cycle.

5. The mailing machine of claim 4 wherein said selector means includes a selector shaft supported within said housing, said selector shaft having a carriage slidably mounted thereon and a first gear secured thereto, a second gear slidably mounted on said selector shaft slidably engaged by said carriage, said second gear being selectively engageable with said racks.

6. In a method of accounting for postage printed by a mailing machine having a print head and a reciprocating platen engageable with the print head, the steps comprising: supplying a microprocessor to the mailing machine, placing a descending register in connection with the microprocessor, providing the print head with selectively variable printing fonts, inputting information to the microprocessor relative to the amount of postage to be printed by the mailing machine, adjusting the printing fonts in accordance with the input information, moving the platen into contact with the print head, sensing the moving of the platen into contact with the print head, communicating the sensing of the moving to the microprocessor and reducing the amount in the descending register in accordance with the amount of postage printed.

* * * * *